(12) United States Patent
Pare et al.

(10) Patent No.: US 11,504,617 B2
(45) Date of Patent: Nov. 22, 2022

(54) VALUE-BASED STREAMING INSTANCE ASSIGNMENT

(71) Applicant: Amazon Technologies, Inc., Seattle, WA (US)

(72) Inventors: Geoffrey Scott Pare, Seattle, WA (US); Joseph Richard Thompson, Seattle, WA (US); Bruce Erwin Brown, Burien, WA (US); Alexander Lambertus Eusman, Seattle, WA (US); Brian J Schuster, Seattle, WA (US); Christopher Byskal, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 16/834,743

(22) Filed: Mar. 30, 2020

(65) Prior Publication Data
US 2021/0299557 A1    Sep. 30, 2021

(51) Int. Cl.
*A63F 13/35* (2014.01)
*G06F 9/455* (2018.01)
*A63F 13/335* (2014.01)

(52) U.S. Cl.
CPC ............ *A63F 13/35* (2014.09); *A63F 13/335* (2014.09); *G06F 9/45558* (2013.01); *G06F 2009/45595* (2013.01)

(58) Field of Classification Search
None
See application file for complete search history.

(56) References Cited

U.S. PATENT DOCUMENTS

| 10,855,616 | B2* | 12/2020 | Morgan | H04L 47/745 |
| 10,953,328 | B1* | 3/2021 | Schuster | G06F 9/45558 |
| 2012/0137287 | A1 | 5/2012 | Pang et al. | |
| 2015/0375113 | A1 | 12/2015 | Justice et al. | |
| 2020/0047067 | A1 | 2/2020 | Leung et al. | |

(Continued)

OTHER PUBLICATIONS

PCT Search Report & Written Opinion for PCT/US2021/024679 dated Jul. 2, 2021, 90 pages.

(Continued)

*Primary Examiner* — Ronald Laneau
(74) *Attorney, Agent, or Firm* — Lee & Hayes, P.C.

(57) ABSTRACT

A game-streaming service of a service provider network is configured to assign virtual machine (VM) instances to game streaming requests using a value-based approach. In order to assign a VM instance to a game streaming request for streaming a game to a client device of a player associated with the game streaming request, the game-streaming service may determine one or more attributes of the game streaming request, such as player attributes and/or game attributes. The game-streaming service may also determine available VM instances allocated to a subscriber associated with the game streaming request, which may be located across disparate geographical regions. A value(s) may be determined based on the attributes of the game streaming request, and the value(s) may be used to select one of the available VM instances for streaming the game as part of a corresponding game session.

20 Claims, 12 Drawing Sheets

(56) References Cited

U.S. PATENT DOCUMENTS

2021/0299557 A1\* 9/2021 Pare .................... G06F 9/45558
2021/0299574 A1  9/2021 Pare et al.

OTHER PUBLICATIONS

Office Action for U.S. Appl. No. 16/834,528, dated Dec. 13, 2021, Pare, "Value-Based Game Session Placements", 14 pages.
Office Action for U.S. Appl. No. 16/834,528, dated Jun. 16, 2022, Pare, "Value-Based Game Session Placements ", 14 pages.

\* cited by examiner

VALUE-BASED STREAMING INSTANCE ASSIGNMENT

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide users with on-demand delivery of compute power, database storage, applications, and other resources, rather than the users having to make upfront investments in hardware and spend time and resources managing the hardware.

Often, users that subscribe to the service provider for use of computing resources in the service provider network also provide products or services to their own clients. For example, the service provider network may provide a game-hosting service to game developers that deploys, operates, and scales session-based game servers in the service provider network for clients of the game developers. In this way, a game developer that has developed an online game may host their session-based, online game using virtual machine (VM) instances running on servers of the service provider network that are accessible by clients of the game developer who may be playing a game.

When the game-hosting service receives a new game session request, the service is tasked with placing a corresponding game session on a fleet of VM instances allocated to a subscriber. Oftentimes the game-hosting service chooses one of the subscriber's fleets that provides the lowest average latency to the players of the game session, and then places the game session on a lowest-cost VM instance within that fleet.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
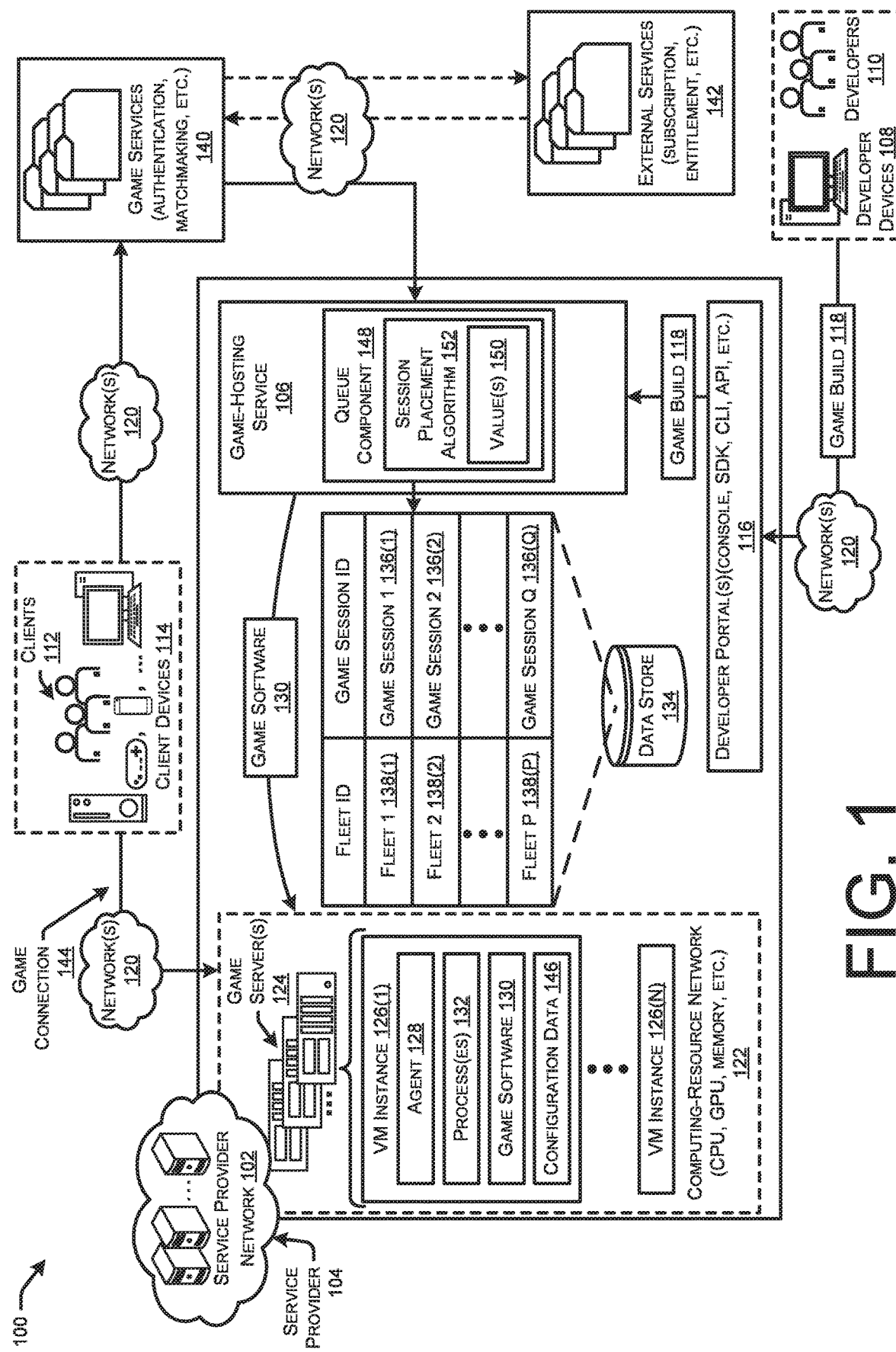
FIG. 1 illustrates a system-architecture diagram of an example environment in which a game-hosting service of a service provider network can place game sessions on fleets of virtual machine (VM) instances using a value-based approach.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (or "subscribers") need not invest in and maintain the computing infrastructure required to implement the various services that they may need. Additionally, subscribers and their clients are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide subscribers with scalable, on-demand, and network-accessible computing platforms over large geographic regions such that the subscribers have readily-available VM instances at their disposal. These service provider networks allow subscribers to immediately have computing infrastructure over large geographic regions to fulfill individual computing needs of the subscriber, and also to provide computing resources to support services provided to clients of the subscribers.

For example, a subscriber to the service provider network may be a game developer (e.g., individual, company, and/or other organization) that has developed an online game that they would like to provide to clients who desire to play the online game. However, the game developer may desire to provide access to their online game to clients over large geographic regions, and for large amounts of users. The amount of computing infrastructure (e.g., compute power, memory, storage, networking, security, etc.) used to support and maintain an online gaming platform over different geographic regions that hosts game sessions for clients may be large enough to be impractical for game developers, particularly new or emerging game developers, to purchase and maintain on their own.

Accordingly, service provider networks may provide a game-hosting service that is a fully, or at least partially, managed online gaming platform. The game-hosting service may deploy, operate, and scale session-based online game servers in the service provider network on behalf of game developers. The game-hosting service may provide groups, or "fleets," of virtual machine instances e.g., VM instances, instances, etc.) that execute on computing resources of the service provider network and host game sessions for clients of a subscribing game developer. Game software included in a game build can be provisioned to a fleet of instances, and the game-hosting service may spin up the fleet of instances, where each instance in the fleet executes at least one process that is to host a game session. When clients of a game developer want to play a game that is hosted by a game-hosting service, the game-hosting service may be tasked with placing a new game session on one of multiple fleets of VM instances that are allocated to the subscribing game developer.

This disclosure describes, among other things, techniques and systems for placing game sessions on fleets of VM instances, and ultimately on a VM instance of the selected fleet, using a value-based approach. The techniques and systems described herein may be implemented by a game-hosting service of a service provider network, where the game-hosting service is configured to place one or more incoming game session requests in a queue, and to process an individual request in the queue for purposes of placing a corresponding game session on a fleet of VM instances. In order to place a game session on a fleet, the game-hosting service may determine one or more attributes of the game session request, such as player attributes of (or, information about) the players associated with the game session request, game attributes of (or, information about) a game corresponding to the game session request, and possibly other types of attributes of the game session request. The game-hosting service may also determine available fleets of VM instances allocated to a subscriber associated with the game session request, which may be located across disparate geographical regions. A value(s) may be determined (e.g., computed, calculated, etc.) based on the one or more attributes of the game session request, and the value(s) may be used to select a fleet of the available fleets for hosting the game session. In order to host the game session, an idle server process executing on a VM instance of the selected fleet may be spun up to host the server component of the game session.

In general, the value(s) (sometimes referred to herein as a "placement value(s)") that is/are used to select a fleet of VM instances for game session placement may be indicative of a preference for placing the game session on a particular fleet of VM instances (e.g., a fleet executing a particular type(s) of VM instance(s)). In some embodiments, a single value (e.g., a score, a metric, etc.) determined from the attributes of a game session request may represent a value within a range of possible values at which a variable can be set, where a maximum value of the range may be indicative of a high-value game session request and/or a strong preference for placing the game session on a particular fleet of VM instances, and a minimum value of the range may be indicative of a low-value game session request and/or a weak preference for placing the game session on a particular fleet of VM instances. In some embodiments, a single placement value determined from the attributes of a game session request may represent a dollar value that may be indicative of a monetary value attributable to an entity (e.g., the game developer) that stands to benefit from hosting the game session on a particular fleet of VM instances.

In some embodiments, the attributes of a game session request can be used to determine multiple values, where each value of the multiple values corresponds to an individual fleet of multiple fleets that are available for placing a corresponding game session. For example, a first value may be determined for a first fleet, the first value being indicative of a preference for placing the game session on the first fleet, a second value may be determined for a second fleet, the second value being indicative of a preference for placing the game session on the second fleet, and so on and so forth, depending on the number of fleets that might be available for placing the game session. In the case of determining multiple placement values, the values can represent any suitable type of value. For example, the multiple values may comprise multiple Boolean values (e.g., true or false, yes or no) that indicate whether it is preferable to place a game session on a given fleet or not (e.g., Fleet 1: Yes, Fleet 2: No, etc.). In other examples, the values may be numerical values within a defined range of values (e.g., a range of [0,100], a normalized range of [0,1], etc.), where the range may be indicative of a weak-to-strong preference for placing the game session on a given fleet to which the value is assigned.

As mentioned, the attributes of the game session request which are used to determine the placement value(s)—may include, without limitation, player attributes of the players associated with the game session request and/or game attributes of the game corresponding to the game session request. Using these types of attributes to determine the placement value(s) is based on the notion that both players and games may vary across incoming game session requests, which means that there may be a benefit in strategically placing a first game session on a first fleet, and placing a second, different game session on a second fleet, even if the first fleet happens to provide a lower average player latency for both sets of players. In other words, it may be beneficial to place some new game sessions on fleets of VM instances that perhaps do not provide the highest-performance player experience during gameplay, yet other metrics may be optimized, such as the overall cost of hosting a subscriber's game sessions.

Player attributes for an individual player associated with a game session request may include, without limitation, a player identifier (ID), a number of games played over a period of time, whether the player is a paying player (as opposed to a player that exclusively plays free-to-play games), and, if so, an amount of money spent by the player over the period of time, an amount of time spent playing games, a time(s) of day that games were played, other players that were involved in a common match, whether a player ID is a known player ID (e.g., a famous/professional gamer, a known blogger, a game reviewer, a person with an above-threshold number of social media followers, etc.), whether the player has purchased downloadable content (DLC)—which is additional content created for an already-released video game, and the like. Game attributes may be indicative of a game mode, a game situation, a game context, or the like. Game attributes may include, without limitation, whether a game is to be played in a tournament mode or in casual mode, and if the game is to be played in tournament mode, a phase of a tournament (e.g., Phase 3 out of a total of 5 Phases), whether the game is to be live-streamed (i.e., broadcast to one or more viewing users), and if so, a projected number of viewing users in the audience, and the like. These are merely example of player attributes and game attributes that may be used to determine a placement value(s), as described herein, for placing a game session on a fleet of VM instances.

An example process implemented by one or more computing devices of a game-hosting service for placing a game session on a fleet of VM instances may include determining one or more player attributes of players associated with a game session request, the one or more player attributes based at least in part on prior gameplay of the players, and the game session request associated with a subscriber of a service provider network, determining a first fleet of VM instances allocated to the subscriber, determining a second fleet of VM instances allocated to the subscriber, and determining a value based at least in part on the one or more player attributes. The process may further include selecting, based at least in part on the value, the first fleet or the second fleet as a selected fleet, and hosting a game session corresponding to the game session request on a VM instance of the selected fleet.

Also disclosed herein are techniques and systems for using a value-based approach to assign a VM instance to a game streaming request for use of the VM instance in streaming a game to a client device of a player associated with the game streaming request. The techniques and systems described herein may be implemented by a game-streaming service of a service provider network, where the game-streaming service is configured to place one or more incoming game streaming requests in a queue, and to process an individual request in the queue for purposes of assigning a VM instance to the game streaming request so that a game can be streamed to a client device of a player associated with the game streaming request. The assigned VM instance may stream the game to the client device by rendering frames and sending the rendered frames to the client device (e.g., over a network) during a game session (e.g., a multiplayer game session). In order to select a VM instance for streaming the game to a given client device, the game-streaming service may determine one or more attributes of the game streaming request, such as player attributes of (or, information about) the player associated with the game streaming request, game attributes of (or, information about) a game corresponding to the game streaming request, and possibly other types of attributes of the game streaming request. The game-streaming service may also determine available VM instances allocated to a subscriber associated with the game streaming request, which may be located across disparate geographical regions. A value(s) may be determined (e.g., computed, calculated, etc.) based on the one or more attributes of the game streaming request, and the value(s) may be used to select a VM instance of the available VM instances for streaming the game to a given client device.

In general, the value(s) (sometimes referred to herein as a "instance assignment value(s)") that is/are used to select a VM instance for streaming a game may be indicative of a preference for streaming the game to a client device using a particular VM instance (e.g., a particular type of VM instance). Similar to the logic described herein for game session placement, a single value e.g., a score, a metric, etc.) determined from the attributes of a game streaming request may represent a value within a range of possible values at which a variable can be set, where a maximum value of the range may be indicative of a high-value game streaming request and/or a strong preference for streaming the game to a client device using a particular VM instance, and a minimum value of the range may be indicative of a low-value game streaming request and/or a weak preference for streaming the game to the client device using a particular VM instance, in some embodiments, a single placement value determined from the attributes of a game streaming request may represent a dollar value that may be indicative of a monetary value attributable to an entity (e.g., the game developer) that stands to benefit from using a particular VM instance to stream the game to a given client device of a player associated with the game streaming request.

Similar to the logic described herein for game session placement, the attributes of a game streaming request can be used to determine multiple values, where each value of the multiple values corresponds to an individual VM instance of multiple VM instances that are available for streaming a game to a given client device. For example, a first value may be determined for a first VM instance, the first value being indicative of a preference for streaming the game to the client device using the first VM instance, a second value may be determined for a second VM instance, the second value being indicative of a preference for streaming the game to the client device using the second VM instance, and so on and so forth, depending on the number of instances that might be available for streaming the game to the client device associated with the game streaming request.

An example process implemented by one or more computing devices of a game-streaming service for assigning a VM instance to a game streaming request may include determining one or more player attributes of a player associated with a game streaming request, the one or more player attributes based at least in part on prior gameplay of the player, and the game streaming request associated with a subscriber of a service provider network, determining a first VM instance allocated to the subscriber for streaming a game to a client device of the player, determining a second VM instance allocated to the subscriber, and determining a value based at least in part on the one or more player attributes. The process may further include selecting, based at least in part on the value, the first VM instance or the second VM instance as a selected VM instance for streaming the game to the client device. In some embodiments, the selection of the selected VM instance is a first phase of a multi-phase process, and the selection of a fleet for game session placement is a second phase of the multi-phase process. In this manner, once a selected VM instance is assigned to the game streaming request associated with a player, and once a game session involving the player is placed on a selected fleet of VM instances, the game session may be hosted on a VM instance of the selected fleet, and the game may be streamed to the client device of the player using the selected VM instance for game streaming.

The value-based approach for game session placement described herein takes into account attributes of a game session request, such as player attributes and/or game attributes. By doing so, a game-hosting service can optimize the placement of game sessions across available fleets of VM instances that are deployed within a service provider network. This is, in part, based on the notion that there is some intrinsic value in placing certain players and/or certain games on certain types of fleets of VM instances, as compared to an approach that uniformly-places all game sessions onto the lowest-latency fleets available, regardless of the attributes of the players and/or the attributes of the game associated with the game session request. For example, there may be intrinsic value in placing, on relatively high-performance fleets, game sessions involving players who have, in the past, played an above-threshold number of games over a period of time, and/or players who have, in the past, spent an above-threshold amount of money playing games via the game-hosting service. Such high-performance fleets may be identified as fleets that can provide low-latency performance during gameplay (e.g., fleets that are instantiated on servers with high-performance/higher-quality hardware, fleets with ample capacity for spinning up and executing new server processes on VM instances, etc.). As another example, there may be intrinsic value in placing, on relatively high-performance fleets, game sessions involving competitive tournaments (e.g., games that are in a later phase of a tournament) and/or games that are to be live-streamed to a viewing audience. In addition, the game-hosting service may, in some embodiments, select a high-performance configuration for hosting a high-value game session, such as by selecting a relatively high frame rate (e.g., 30 frames per second (FPS), as opposed to a lower, 15 FPS frame rate), a relatively high resolution (4K, as opposed to a lower, 1080P resolution). On the other hand, game session requests with attributes (e.g., player attributes and/or game attributes) that fail to meet criteria for placing game sessions on high-performance fleets may, instead, be placed on relatively low-performance fleets and/or such game sessions may be hosted with relatively low-performance configurations, which may allow for packing more game sessions onto a single server process and/or a single VM instance to lower the cost (to the subscribing game developer) of hosting the game session. Accordingly, the techniques and systems described herein can make certain games viable that would not otherwise be viable, which is beneficial for both the game industry and for the players who play video games via the game-hosting service.

The value-based approach for assigning a streaming instance to a game streaming request described herein also takes into account attributes of the game streaming request, such as player attributes and/or game attributes. By doing so, a game-streaming service (which may be implemented as part of the game-hosting service) can optimize the assignment of VM instances deployed within the service provider network for streaming games to individual client devices. This is, in part, based on the notion that there is some intrinsic value in streaming games to client devices using certain VM instances. For example, there may be intrinsic value in using a relatively high-performance VM instance to stream a game to a client device of a player who has, in the past, played an above-threshold number of games over a period of time, and/or a player who has, in the past, spent an above-threshold amount of money playing games via the game-streaming service. In addition, the game-streaming service may, in some embodiments, select a high-performance configuration for streaming the game to such a player, such as by selecting a relatively high frame rate (e.g., 30 frames per second (FPS), as opposed to a lower, 15 FPS frame rate), a relatively high resolution (4K, as opposed to a lower, 1080P resolution).

In addition, the techniques and systems described herein place more control in the hands of a subscribing game developer, at least in terms of allowing the game developer to control how resources (e.g., fleets of VM instances) of the service provider network are allocated amongst their clients (e.g., players of the subscribing game developer's video games). For example, a subscriber may be able to create its own customized session placement algorithm that is utilized by the game-hosting service for game session placement and/or to create its own customized streaming instance assignment algorithm that is utilized by the game-hosting service for assignment of a VM instance for streaming a game to a given client device. Additionally, or alternatively, a subscriber may voluntarily provide its own attributes (e.g., player attributes, game attributes, etc.) that are usable by the game-hosting service to determine where to place game sessions and/or which VM instances to use for game streaming using the value-based approaches described herein, thereby optimizing game session placements for the subscriber. Additionally, or alternatively, a subscriber may specify customized weights for particular attributes (e.g., player attributes, game attributes, etc.) that may be taken into account by the game-hosting service in determining the placement values for different available fleets during game session placement and/or in determining instance assignment values for different available VM instances during the assignment of instances to game streaming requests. These and other aspects described herein provide subscribers of the service provider network with more control and more autonomy over how their players are dispersed across available resources (e.g., fleets of VM instances) within the service provider network.

While some of the techniques are described herein as being performed in a service provider network of a service provider, the techniques may similarly be applied in other computing networks, such as on-premise servers managed by the game developers themselves. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-arthitecture diagram of an example environment 100 in which a game-hosting service of a service provider network 102 can place game sessions on fleets of virtual machine (VM) instances using a value-based approach.

As illustrated, the service provider network 102 may be operated and/or managed by a service provider 104. The service provider network 102 may provide various services to users to fulfill their computing resource needs, such as cloud-based computing resources. For example, the service provider network 102 may provide cloud-based, scalable, and network accessible compute power services, storage services, database services, and/or other services. As illustrated, the service provider network 102 may also provide a game-hosting service 106 that is a scalable, cloud-based runtime environment for online games, including session-based multiplayer games. The game-hosting service 106 may be fully managed by the service provider 104 and deploy, operate, and scale the session-based multiplayer game servers in the cloud-based, or network-based, environment. For example, the game-hosting service 106 may not only provide the hardware to host the game sessions, but also manage ongoing activity, security, storage, and performance tracking. Additionally, the game-hosting service 106 may provide auto-scaling capabilities such that instances supporting game sessions can be spun up or spun down based on player demand.

To utilize the game-hosting service 106, developers 110 may utilize developer devices 108 to register for an account (e.g., a user account, subscriber account, etc.) with the game-hosting service 106. This may allow the developers 110 (sometimes referred to herein as "subscribers" 110) to subscribe to the game-hosting service 106, provide a game build(s) for their online game(s), and to provide their clients 112 with access to the online game(s) via their client devices 114 without the developers 110 having to invest in the computing resources (e.g., on-premise resources) needed to host the online game sessions for their clients 112. In order to utilize the game-hosting service 106, the developers 110 may provide a game build 118 to the game-hosting service 106 via one or more developer portals 116. The developer portal(s) 116 may include one or more of a web-based console, a software-development kit (SDK), a command-line interface (CLI), an application programming interface (API), and/or any other means by which a developer 110 may specify and/or provide, among other things, a game build 118 to the game-hosting service 106.

The game build 118 may correspond to any type of online game that may host a game session for one or more clients 112 (sometimes referred to herein as "players" 112). For instance, the game build 118 may correspond to a session-based single player online game, or a session-based multi-player online game. The game build may represent any type of online game, such as real-time strategy (RTS) games, first person shooter (FPS) games, multiplayer online battle arena (MOBA) games, role playing (RPG) games, massively multiplayer online (MMO) games, massively multiplayer online role player games (MMORPG), virtual board games (e.g., chess, checkers, etc.), action-adventure games, simulation games, strategy games, sports games, virtual reality games, and/or any other game that may be played in an online environment.

Generally, the client devices 114 may comprise any type of computing device that may be utilized for online gaming. For instance, the client devices 114 may include laptop computing devices, desktop computing devices, mobile phones, gaming systems, controller-based devices, virtual and/or augmented reality devices (e.g., head-mounted displays (HMDs)), other wearable devices, biometric sensors, projectors, televisions, and/or any computing device usable on its own, or in conjunction with other devices, for online gaming. In some examples, at least part of the online game may execute and/or be stored locally on the client devices 114.

The game build 118 may include the game software for the online game, and may further include server executables, supporting assets, libraries, and dependencies that are all used to host and/or execute the game software on an instance. The developers 110 may provide the game build 118 through the developer portal(s) 116, such as by uploading the game build 118 over one or more networks 120 (e.g., the Internet, wireless wide area networks (WANs), personal area networks (PANs), wired and/or wireless local area networks (LANs), etc.). The network(s) 120 may comprise any type of network or combination of network, including wired and/or wireless networks. Once a developer 110 has uploaded their game build 118, the game-hosting service 106 may deploy the game software 130 to one or more game servers 124 in a computing-resource network 122. For instance, the game software 130 may be installed on one or more virtual machine (VM) instances 126 that are at least partially managed by a local agent 128 (e.g., script, program, application, etc.).

The computing-resource network 122 may include data centers that each include one or more computing resources, such as VM instances 126(1) to 126 (N) where "N" is any integer greater than or equal to 2 (referred to herein collectively as "VM instances 126" or just "instances 126"). The data centers may house the game server(s) 124 and may be located across disparate geographical regions such that computing resources are available to support functionality for cloud-based services provided by the service provider network 102. The computing resources may include various combinations of hardware-based components, such as central processing units (CPU), graphics processing units (GPU), memory, storage, network capacity, security, and/or any other type of hardware-based resource to support cloud-based services, such as the game-hosting service 106. In some examples, the computing resource network 122 may further include respective memories that store various firmware-based and/or software-based resources that provide the functionality of the services, such as the instances 126 on which an agent 128 executes, the game software 130 executes, and one or more processes 132 execute to support a game session(s).

Generally, the agent 128 may be responsible for handling various processes on an instance 126, such as spinning up an instance 126, spinning down an instance 126, handling lifetime processes of the instance 126, retrieving game session assignments for processes 132 executing on the instance 126, executing processes 132 on the instance 126 to host a game session(s), managing resources of the instance 126, installing patches and/or other software on the instance 126 and/or various other actions for managing the instance 126. A data store 134 may, among other things, keep track of the placement of game sessions 136 on particular fleets 138 of VM instances 126. It is to be appreciated that, in addition to fleet assignments, the data store 134 may track more granular data for game session placement, such as the instance ID of a VM instance 126 on Which the game session 136 is placed, the server process 132 assigned to host the game session 136, etc. The data store 134 may track additional data as well, such as the processes 132 that are executing on VM instances 126 across subscribers' 110 fleets 138, the ownership of those processes 132 in terms of whether they are available (e.g., executing in idle mode without an owner), or already assigned to a game session 136 (or game session request), the regions in which fleets 138 are located, etc.

In some examples, each process 132 (sometimes referred to as a "server process" 132) that executes on an instance 126 may support a game session 136 that engages one or more clients 112 via their client device(s) 114. That is, each process 132 may support one game session 136. For instance, the process(s) 132 may each be running the game software 130 to support a game session 136 for one or more clients 112. Often, a process 132 supports a game session 136 for multiple clients 112 as with a multi-player game). A game session 136 is an instance of the game software 130 running on a server that clients 112 can connect to and interact with. The game defines the basic characteristics of the game session 136, such as the life span or the number of players 112 involved. Although many of the examples described herein pertain to a single process 132 supporting a single game session 136, it is to be appreciated that, depending on the game (e.g., the size of the game, complexity of the game, the number of clients 112 engaged in a single game session 136, and/or other factors), a process 132 may handle multiple game sessions (e.g., for "lighter weight" mobile games), and/or perform other tasks besides hosting a game session 136 to help manage game sessions, interact with client devices 114 and/or the game-hosting service 106, manage the instance 126, and/or perform other actions. The process(es) 132 may be binary processes 132, executable processes 132, etc., running on the VM instance 126 that consume or utilize the underlying hardware resources and/or other resources.

To play in a game session, the client devices 114 may interact directly with the game-hosting service 106, and/or through various backend game services to retrieve information on current game sessions 136, to request new game sessions 136, and/or reserve slots in game sessions 136. For instance, the client devices 114 may interact, over one or more networks 120, with game services 140 that may handle communication between client devices 114 and the game-hosting service 106. Further, the game services 140 may handle additional tasks or provide additional services, such as player authentication and authorizations, team building and matchmaking, and inventory control. For example, when a client 112 wants to start a new game, the client device 114 may call the authentication service to first verify the client's 112 identity, and then send a game session request to the game-hosting service 106.

In further examples, the online game of a developer 110 may rely on or utilize one or more additional external services 142, such as for validating a subscription membership and/or determining entitlements for a client's account. As shown, the information from the external services 142 may be passed to the game server(s) 124 via the game services 140 and the game-hosting service 106 without going through the client device(s) 114.

To establish or join a game session, clients 112 may utilize their client devices 114 (e.g., applications, software, or other programs executing thereon) to request (e.g., via an API call) that the game-hosting service 106 place them in a game session 136. To create a game session 136, a match is generally formed or made as an initial step, followed by a step of placing the match. In some embodiments, the game services 140 may execute matchmaking logic to match players 112 together in matches. For example, if a player 112 connects to the game services 140 over the network 120 for playing a multiplayer game, the client device 114 of the player 112 may present a screen that lists other online players 112 for selection, and the player 112 can select another player 112 from the list to play against. Other matchmaking factors can be considered as well, or as an alternative, such as skill level (e.g., match players 112 with commensurate skill levels). In some embodiments, the game-hosting service 106 may execute matchmaking logic on behalf of a game developer 110.

After forming a match, the game-hosting service 106 may be tasked with placing the match (or, the game session 136 for the match). It is to be appreciated that, in some embodiments, short of forming a new game session 136, the game-hosting service 106 may identify an already running process 132 that is hosting a game session 136, and if the active game session 136 has an open player slot(s) that the player(s) 112 associated with the game session request can be placed into, the game-hosting service 106 may assign the player(s) 112 to the open player slot(s) in the active game session 136, without having to form a separate match of a new game session 136. Otherwise, the game-hosting service 106 may have already spun up VM instances 126 in fleets 138 that are allocated for various subscribers 110 of the service provider network 102, and each of the spun up VM instances 126 may have server processes 132 executing thereon in idle mode until the processes 132 are assigned to a game session request for hosting a corresponding game session 136 (associated with a match) until the game session 136 ends. Other than loading maps and other data for hosting a particular game session 136, these idle processes 132 may be ready to start hosting a game session 136 as soon as they are assigned to a game session request. The game-hosting service 106 may be tasked with placing a new game session 136 on an available fleet 138 allocated to a subscriber 110, and to identify a server process 132 executing on a VM instance 126 of the selected fleet 138, which will serve multiple players 112 in a set (e.g., 2, 10, 100, etc.) of players 112 that have been matched together for playing a multi-player game. Accordingly, for an incoming game session request, the game-hosting service 106 may resolve a fleet alias by calling a routing service, load fleet data to determine available fleets 138 of VM instances 126, select a fleet 138 for placing the game session 136, and identify available (e.g., idle) processes 132 that are usable to host the game session 136 corresponding to the incoming game session request. It is to be appreciated that, for efficiency reasons, the game-hosting service 106 may "pack" server processes 132 as tight as possible to avoid overutilization of resources. That is, the game-hosting service 106 may try to minimize the number of processes 132 that are concurrently executing in idle mode in order to have available a sufficient number of processes 132 while also avoiding unnecessary computing resource consumption that could be utilized for other purposes.

When a game session 136 is created, the assigned process 132 executing on a VM instance 126 of the subscriber's fleet 138 may be instructed to host (or support) the created game session 136 for one or more clients 112 of the subscriber 110 that are associated with the game session 136. The client application(s) running on the client device(s) 114 associated with the game session may receive connection information (e.g., a port of a server 124, an IP address, etc.), and may create a game connection(s) 144 by connecting directly, over the network(s) 120, to the open game server 124 using a player session ID(s). The server process 132 may then accept the player ID(s) as a valid ID(s) and accepts, or rejects, the game connection(s) 144. If connected, the player session is set to active and the client(s) 112 begins playing the game using their client device(s) 114 and the game connection 144 that is established between the game server 124 that has the instance 126 with the process 132 executing to host the selection game session 136. Once a game session 136 has ended (e.g., clients 112 quit, the game ends, time out, etc.), the client application on each of the involved client devices 114 may disconnect from the process 132, and the game-hosting service 106 can change the game session 136 to terminated, upload a game session log to storage, and update a fleet utilization to indicate that the game server 124 has one less process executing 132.

As mentioned, the game-hosting service 106 may deploy a group of instances 126, often referred to as a "fleet" 138 of instances 126, on game servers 124. In various examples, a fleet 138 of instances 126 may all support the same game build 118, or the same online game. Each instance 126 in a fleet 138 may run multiple processes 132 simultaneously, depending on the hardware capability, and each server process 132 can host at least one game session 136. Since a game build 118 can have one or multiple executable files, a developer 110 and/or the service provider 104 may configure a fleet 138 to run multiple server processes 132 of each executable on each instance 126. In order to configure a fleet 138 of instances 126 to run one or more processes 132, the developer 110 and/or service provider 104 may generate configuration data 146 that describes what processes 132 run on each instance 126 in a fleet 138. Each instance 126 in the fleet 138 launches the server processes 132 specified in the configuration data 146 and launches new ones as existing processes 132 end. Each instance 126 may regularly check for updated configuration data 146 and follows the new instructions.

The value-based game session placement techniques described herein may be implemented, at least in part, by a queue component 148 of the game-hosting service 106. The queue component 148 may receive incoming game session requests associated with players 112 who are requesting to be matched with other players for playing a multiplayer game. The queue component 148 may place these incoming game session requests in a queue and may process each game session request to identify a fleet 138 on which to place a corresponding game session 136. When a queued game session request is processed for game session placement, the queue component 148 may determine attributes of the game session request, which are used to determine (e.g., compute, calculate) one or more values 150 for game session placement. The value(s) 150 is/are sometimes referred to herein as a "placement value(s) 150" because the value(s) 150 dictate(s) where a game session is to be placed within the service provider network 102. The attributes of the game session request that are used to determine the value(s) 150 may include, without limitation, player attributes. Player attributes for an individual player 112 associated with a game session request may include, without limitation, a player identifier (ID), a number of games played over a period of time, whether the player 112 is a paying player (as opposed to a player that exclusively plays free-to-play games), and, if so, an amount of money spent by the player 112 over the period of time, an amount of time spent playing games, a time(s) of day that games were played, other players 112 that were involved in a common match, whether a player ID is a known player ID (e.g., a famous/professional gamer, a known blogger, a game reviewer, a person with an above-threshold number of social media followers, etc.), whether the player has purchased downloadable content (DLC)—which is additional content created for an already-released video game, and the like. In some cases, the service provider 104 may implicitly derive at least some of the player attributes based on running a subscriber's 110 game on behalf of the subscriber 110 within the service provider network 102. However, at least some of the player attributes may additionally, or alternatively, be provided by the subscriber 110 associated with a game session request. Such voluntary submission of player attributes by the subscriber 110 may help optimize game session placement, so there may be an incentive for the subscriber 110 to do so.

The attributes of the game session request that are used to determine the value(s) 150 may additionally, or alternatively, include game attributes, which may be indicative of a game mode, a game situation, a game context, or the like. Game attributes may include, without limitation, whether a game is to be played in a tournament mode or in casual mode, and if the game is to be played in tournament mode, a phase of a tournament (e.g., Phase 3 out of a total of 5 Phases), whether the game is to be live-streamed (i.e., broadcast to one or more viewing users), and if so, a projected number of viewing users in the audience, and the like. In some cases, the service provider 104 may implicitly derive at least some game attributes based on running a subscriber's 110 game on behalf of the subscriber 110 within the service provider network 102. However, at least some of the game attributes may additionally, or alternatively, be provided by the subscriber 110 associated with a game session request. Again, such voluntary submission of game attributes by the subscriber 110 may help optimize game session placement, so there may be an incentive for the subscriber 110 to do so.

The queue component 148 may also determine available fleets 138 of VM instances 126 that are allocated to the subscriber 110 associated with the game session request, and may utilize a session placement algorithm 152 to determine (e.g., calculate, compute, etc.) the value(s) 150 for game session placement. The available fleets 138 may be located across disparate geographical regions, and each may have different performance characteristics based on the region and/or based on the specific hardware and/or configurations of the VM instances 126 on those fleets 138. For example, average player latency may vary across a set of available fleets 138 for game session placement such that a first fleet 138(1) provides relatively lower latency (on average across all of the players 112 associated with the game session request) and a second fleet 138(2) provides relatively higher latency (on average across all of the players 112 associated with the game session request), or vice versa. This can be based on various factors, as mentioned. In some cases, VM instances 126 of available fleets 138 may vary in terms of available capacity and/or current resource utilization. For example, a first fleet 138(1) may include a VM instance 126 running one process, and a second fleet 138(2) may include a VM instance 126 running multiple (e.g., four) processes. This can mean that different instances 126 of the different fleets 138 can have different capacities, where the VM instance 126 running the single process may be able to provide the snappiest response with relatively less jitter during gameplay, and the VM instance 126 running the multiple processes concurrently may have less capacity to host a new game session, yet it may be able to provide a lower cost for hosting the game session (e.g., at a relatively lower frame rate).

The value(s) 150 determined for a game session request is/are used to select a fleet 138 of VM instances 126 for game session placement. In some embodiments, a single value 150 (e.g., a score, a metric, etc.) determined from the attributes of a game session request may represent a value within a range of possible values at which a variable can be set, where a maximum value of the range may be indicative of a high-value game session request and/or a strong preference for placing the game session on a particular fleet of VM instances, and a minimum value of the range may be indicative of a low-value game session request and/or a weak preference for placing the game session on a particular fleet of VM instances. In some embodiments, a single placement value 150 determined from the attributes of a game session request may represent a dollar value (e.g., $0.50, $1.50, etc.) that may be indicative of a monetary value attributable to an entity (e.g., the game developer) that stands to benefit from hosting the game session on a particular fleet of VM instances.

In some embodiments, the attributes of a game session request can be used to determine multiple values 150, where each value 150 of the multiple values 150 corresponds to an individual fleet 138 of multiple fleets 138 that are available for placing a corresponding game session 136. For example, a first value 150 may be determined for a first fleet 138(1), the first value 150 being indicative of a preference for placing the game session 136 on the first fleet 138(1), a second value 150 may be determined for a second fleet 138(2), the second value 150 being indicative of a preference for placing the game session 136 on the second fleet 138(2), and so on and so forth, depending on the number "P" of fleets 138 that might be available for placing the game session 136, "P" being any suitable integer greater than or equal to 2. In the case of determining multiple placement values 150, the values 150 can represent any suitable type of value. For example, the multiple values 150 may comprise multiple Boolean values (e.g., true or false, yes or no) that indicate whether it is preferable to place a game session 136 on a given fleet 138 or not (e.g., Fleet 1: Yes, Fleet 2: No, etc.). In other examples, the values 150 may be numerical values within a defined range of values (e.g., a range of {0,100}, a normalized range of [0,1], etc.), where the range may be indicative of a weak-to-strong preference for placing the game session on a given fleet 138 to which the value 150 is assigned.

For example, a first placement value 150 of 1 (in a range of [0,1]) may be determined for a first fleet 138(1), a second placement value 150 of 0.5 (in a range of [0,1]) may be determined for a second fleet 138(2), and so on and so forth, for any number of P available fleets 138(1)-(P). In this example, a value 150 of 1 for the first fleet 138(1) might represent a strong preference for placing the game session 136 on the first fleet 138(1). Meanwhile, a value 150 of 0.5 for the second fleet 138(2) might represent a relatively weaker preference for placing the game session 136 on the second fleet 138(2). In this example, the queue component 148 may select the first fleet 138(1) based on the placement values 150 determined for the available fleets 138(1) and 138(2), and the game session 136 may be hosted on a VM instance 126 of the selected first fleet 138(1) by identifying an idle server process 132 on the VM instance 126 and instructing the server process 132 to host the game session 136. As game sessions 136 are placed, the game session placements may be stored in the data store 134, at least until the game sessions 136 are terminated, as shown in FIG. 1. For example, FIG. 1 illustrates an example where a first game session 136(1) has been placed on a first fleet 138(1), a second game session 136(2) has been placed on a second fleet 138(2), and a $Q^{th}$ game session 136(Q) has been placed on a $P^{th}$ fleet 138(P), where "Q" is any suitable integer. It is to be appreciated that multiple game sessions 136 may be placed on the same fleet 138 due to the fact that each fleet 138 instantiates multiple VM instances 126, and each VM instance 126 may execute one or more server processes 132, considering that each process 132 may host one or more game sessions 136. Example details of the session placement algorithms 152 that can be used by the queue component 148 for value-based game session placement are described in further detail with reference to the following figures. In general, the session placement algorithm 152 accounts for the attributes of a game session request in determining the value(s) 150 for game session placement.

In an illustrative example, an incoming game session request may be associated with player attributes that indicate at least one of the players 112 associated with the game session request has played an above-threshold number (e.g., over 1000) of games within a period of time (e.g., within the past 6 months). In this example, the session placement algorithm 152 using a rule-based approach, a machine-learning model(s), etc.—might determine a relatively-high placement value 150 for this game session request in order to place the corresponding game session on a fleet 138 that can provide relatively-high performance (e.g., low latency, or an otherwise "snappy" gameplay experience) to the client devices 114 of the players 112 of the game session request. In another illustrative example, another incoming game session request may be associated with game attributes that indicate a game is to be live-streamed to an audience, and the session placement algorithm 152—using a rule-based approach, a machine-learning model(s), etc.—may determine a relatively-high placement value 150 for this game session request in order to place the corresponding game session 136 on a fleet 138 that can provide relatively-high performance (e.g., low latency, or an otherwise "snappy" gameplay experience) to the client devices 114 orf the players 112 of the game session request. By contrast, yet another incoming game session request may be associated with players 112 who are all non-paying players of a casual, free-to-play game. Given these player attributes and game attributes of the game session request, the session placement algorithm 152—using a rule-based approach, a machine-learning model(s), etc.—may determine a relatively-low placement value 150 for this game session request in terms of placing the corresponding game session 136 on a high-performance fleet 138, and/or the value(s) 150 may include a relatively-high placement value 150 for a low-performance fleet 138 that is indicative of a strong preference for placing the corresponding game session 136 on a fleet 138 that provides relatively-low performance (e.g., higher latency, as compared to other available fleets 138), perhaps at a lower cost (to the subscriber 110) of hosting the game session 136. Placing a game session 136 on a low-performance fleet 138 and/or hosting the game session 136 with a low-performance configuration (e.g., a relatively low frame rate, a relatively low resolution, etc.) may allow for packing more game sessions onto a single server process 132 and/or a single VM instance 126 to lower the cost (to the subscribing game developer 110) of hosting the game session 136, thereby providing a cost savings for the developer 110.

In some embodiments, the value(s) 150 may be recalculated during a game session 136 as attributes 306 change after a start of the game session 136. Based on a recalculated value(s) 150, a game session 136 may be replaced onto a different fleet 138, such as by transferring the game session 136 from a hosting process 132 on a first fleet 138(1) to a different process 132 on a second fleet 138(2) where the game session 136 is resumed on a VM instance 126 of the second fleet 138(2). To avoid an interruption in service to the players 112, a real-time data migration procedure may be employed to transfer the game session 136 with little-to-no interruption.

Figure 2:
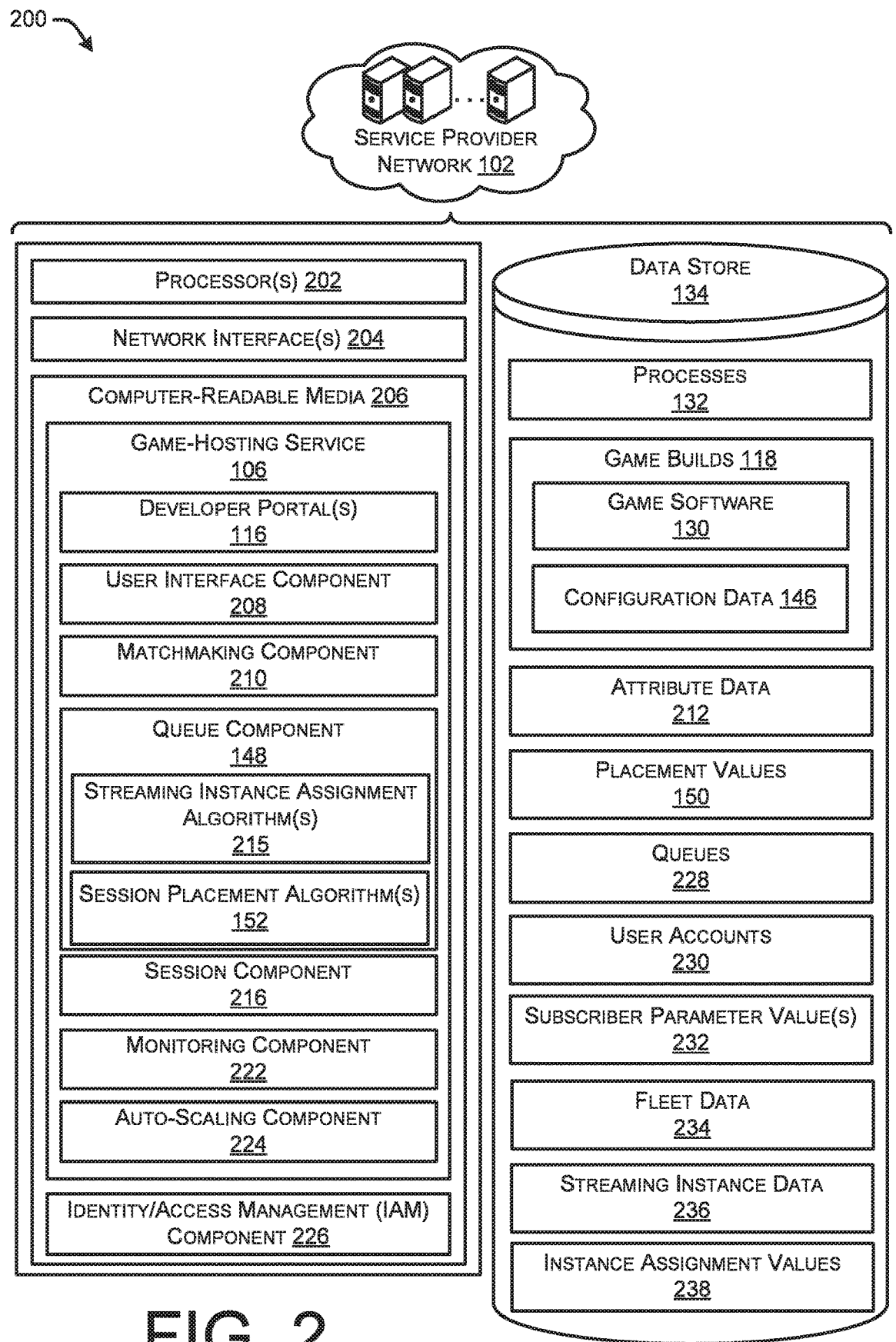
FIG. 2 illustrates a component diagram of an example service provider network that provides a game-hosting service that is configured to place game sessions on fleets of VM instances using a value-based approach.

FIG. 2 illustrates a component diagram 200 of an example service provider network 102 that provides a game-hosting service 106 that is configured to place game sessions 136 on fleets 138 of VM instances 126 using a value-based approach. As illustrated, the service provider network 102 may include one or more hardware processors 202 (processors) configured to execute one or more stored instructions. The processor(s) 202 may comprise one or more cores. Further, the service provider network 102 may include one or more network interfaces 204 configured to provide communications between the service provider network 102 and other devices, such as the developer device(s) 108 and/or the client device(s) 114. The network interfaces 204 may include devices configured to couple to PANs, wired and wireless LANs, wired and wireless WANs, and so forth. For example, the network interfaces 204 may include devices compatible with Ethernet, Wi-Fi™, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS® SERVER operating system from MICROSOFT Corporation of Redmond, Wash. According to further embodiments, the operating system(s) can comprise the UNIX operating system or one of its variants. It should be appreciated that other operating systems can also be utilized.

The computer-readable media 206 may store portions, or components, of the game-hosting service 106 described herein. For instance, the computer-readable media 206 may store the developer portal(s) 116 through which developer(s) 110 may provide their game builds 118, and/or other input for managing their online games and/or for managing the placement of game sessions 136 on fleets 138 of VM instances 126 within the service provider network 102. Additionally, the computer-readable media 206 may store a user interface component 208 configured to provide portals, user interfaces, and/or other avenues through which clients 112 and/or subscribers 110 may interact with information (e.g., account settings) and/or the online games hosted by the game-hosting service 106. In some embodiments, the user interface component 208 may provide interactive elements allowing subscribers 110 to customize a session placement algorithm(s) 152 for game session placement, as described herein, and/or to provide attribute data 212 (e.g., player attributes of their players 112, game attributes of their games, etc.) and/or weights associated therewith for use in game session placement.

The computer-readable media 206 may further store a matchmaking component 210 configured to, when executed by the processor(s) 202, provide various matchmaking functionality for the game-hosting service 106. Generally, the matchmaking component 210 may include a customizable rules engine that allows developers 110 to design how to match clients 112 (or players 112) together based on player attributes and game modes that are appropriate for the online game. The matchmaking component 210 may further manage the details for forming player groups for game sessions 136, and placing the player groups into active or recently created/initiated game sessions 136. As mentioned, the game services 140 may include its own matchmaking logic. In some embodiments, some matchmaking is performed by the game services 140, while additional matchmaking logic may be executed by the matchmaking component 210 of the service provider network 102 to augment the matchmaking process.

The computer-readable media 206 may further store the queue component 148 introduced in FIG. 1. The queue component 148 may be configured to, when executed by the processor(s) 202, manage queues for assigning VM instances to game streaming requests and/or for placing new game sessions 136 on appropriate or available hosting resources (e.g., instances 126) across fleets 138 and/or geographic regions. Generally, the queue component 148 search for available streaming resources (e.g., available processes 132) on a VM instance used for streaming the game to a given client device 114, the VM instance having been selected using the value-based approach described herein (See FIGS. 10-12). For an incoming game session request involving multiple players 112, the matchmaking component 210 builds on the queue component 148 because, once a match is created, the matchmaking component 210 may hand or send the match details to a queue that is managed by the queue component 148. The queue component 148 may then search for available hosting resources (e.g., available processes 132) in a fleet 138 of instances 126, the fleet 138 having been selected using the value-based approach described herein. The queue component 148 may utilize a streaming instance assignment algorithm 215 that is configured to determine (e.g., output) one or more values 238 for assigning a streaming instance to a queued game streaming request, the instance assignment value(s) 238 indicating a value associated with the game streaming request and/or a preference for using a particular VM instance for streaming a game to a given client device 114 of a player 112 associated with the game streaming request. Therefore, the queue component 148 may provide attributes of a game streaming request as input to the streaming instance assignment algorithm 215 to determine a value(s) 238 that is/are used to select a VM instance for game streaming. Also, as mentioned, the queue component 148 may utilize a session placement algorithm 152 that is configured to determine (e.g., output) one or more placement values 150 for placing a game session 136 on an available fleet 138, the value(s) 150 indicating a value of the game session 136 and/or a preference for placing the game session 136 on a particular fleet 138. Therefore, the queue component 148 may provide attributes of a game session request as input to the session placement algorithm 152 to determine a value(s) 150 that are used to select a fleet 138 for game session placement.

The computer-readable media 206 may further store a session component 216 that, when executed by the processor(s) 202, is configured to query the data store 134 for idle processes 132 executing on VM instances 126 of the selected fleet 138, and to assign the queued game session request to an idle process 132 that will host the game session 136. The assignment of processes 132 to a game session 136 may occur in various ways. In general, session component 216 may traverse a list of the available processes 132 returned in query results, one-by-one, attempting to assign the first process 132 in the list to the game session request, and if the assignment fails, running down the list, in order, until a process 132 in the list is successfully assigned to the game session request, if a batch of processes 132 are assigned in parallel, this assignment procedure may iterate for each game session request until all game session requests are assigned at least one process 132. A list of available processes 132 that are traversed for this assignment procedure may be ordered in any suitable manner. For example, the data store 134 may keep track of the "age" of executing processes 132 and, thus, may order query results based on age (e.g., from the oldest process 132 to the youngest process 132, from the youngest process 132 to the oldest process 132, etc.). In this manner, the session component 216 may scan the list of available processes 132 with a preference to assign processes 132 based on the age of the processes 132 by traversing the list from top-to-bottom. In some embodiments, available processes 132 in the data store 134 may be filtered on an age-related criterion (e.g., return available processes 132 that were created in the last N days, N being any suitable number) to generate query results that include a filtered set of processes 132 that satisfy the criterion. The data store 134 is shown as storing the processes 132, the attribute data 212 (e.g., the player attributes, game attributes, etc.), and the placement values 150, among other data.

The computer-readable media 206 may further store a monitoring component 222 that, when executed by the processor(s) 202, collects information for a game session 136 and logs the information in a storage location for a developer 110. For instance, the monitoring component 222 may identify and collect metrics for game sessions 136 hosted on an instance 126, such as length of the game sessions, players involved, type of game, events occurring in the game, hardware utilization metrics, players leaving and/or entering the game, and/or various other metadata for a game session 136 that may be of interest to a developer 110.

The computer-readable media 206 may further store an auto-scaling component 224 that, when executed by the processor(s) 202, scales up or down the number of instances 126 available to host game sessions or other processes 132. For example, the auto-scaling component 224 may provide a fast, efficient, and accurate way to match fleet capacity to player usage. In some examples, the auto-scaling component 224 may track the fleet's 138 hosting metrics and determine when to add or remove instances 126 based on a set of guidelines, called policies, that may be defined by the developer 110. The auto-scaling component 224 can adjust capacity in response to changes in player demand to help ensure that the fleet of instances 126 has availability for new players without maintaining an excessive amount of idle resources.

To utilize the services provided by the service provider network 102, clients 112 and developers 110 may register for an account with the service provider network 102. For instance, clients 112 and developers 110 may utilize a device to interact with an identity and access management (IAM) component 226 that allows the clients 112 and developers 110 to create an account with the service provider network 102. Generally, the IAM component 226 may enable the clients 112 and developers 110 to manage access to their cloud-based services and computing resources securely. Using the IAM component 226, the developers 110 may manage their game builds 118 anchor fleets 138 of instances 126 as described herein. Additionally, clients 112 may interact with their account to, for example, change settings for their gaming experience, management payments, and/or other functions.

The data store 134 (e.g., object storage) may represent one or more data stores that stores various data described herein at one or more locations in the service provider network 102. The data store 134 may track processes 132 that are currently executing on VM instances 126 of the service provider network 102. Records for these processes 132 may include additional data/metadata including, without limitation, an owner (e.g., whether the process is idle and available, or assigned to a game session 136 (or game session request) as an owner), identifiers of VM instance 126, fleet 138, subscriber 110, etc. The data store 134 may further include the game builds 118 for developers 110 that include game software 130 and configuration data 146, which may be updated at any suitable time by the developer 110 or otherwise, along with other data described herein. The data store 134 may further store the attribute data 212 that specifies attributes associated with game session requests, such as player attributes of players 112 associated with a game session request, game attributes associated with a game of the game session request, and similar attributes. The data store 134 may further store the placement values 150 determined by the session placement algorithm(s) 152 used for game session placement, queues 228 in which new player groups or game groups (i.e., game session requests) are queued before being placed into instances 126 (e.g., and assigned a process 132 executing thereon), user accounts 230 for the clients 112 and/or developers 110, subscriber parameter values 232, which may dictate attributes of a game session request and/or weights assigned to the attributes for use in value-based game session placement, and fleet data 234, which may contain data on fleets 138, such as the region of the fleet 138, a number of VM instances 126 and/or processes 132 spun up on the fleet 138, types of instances 126, cost of the VM instances 126, and other similar fleet attributes. The data store 134 may further store streaming instance data 236, which may contain data on VM instances that are usable for streaming games to client devices 114. This data may be included as part of the fleet data 234 or as separate data. The data store 134 may further store the instance assignment values 238 determined by the streaming instance assignment algorithm(s) 215 used for game streaming.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service-provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

Figure 3:
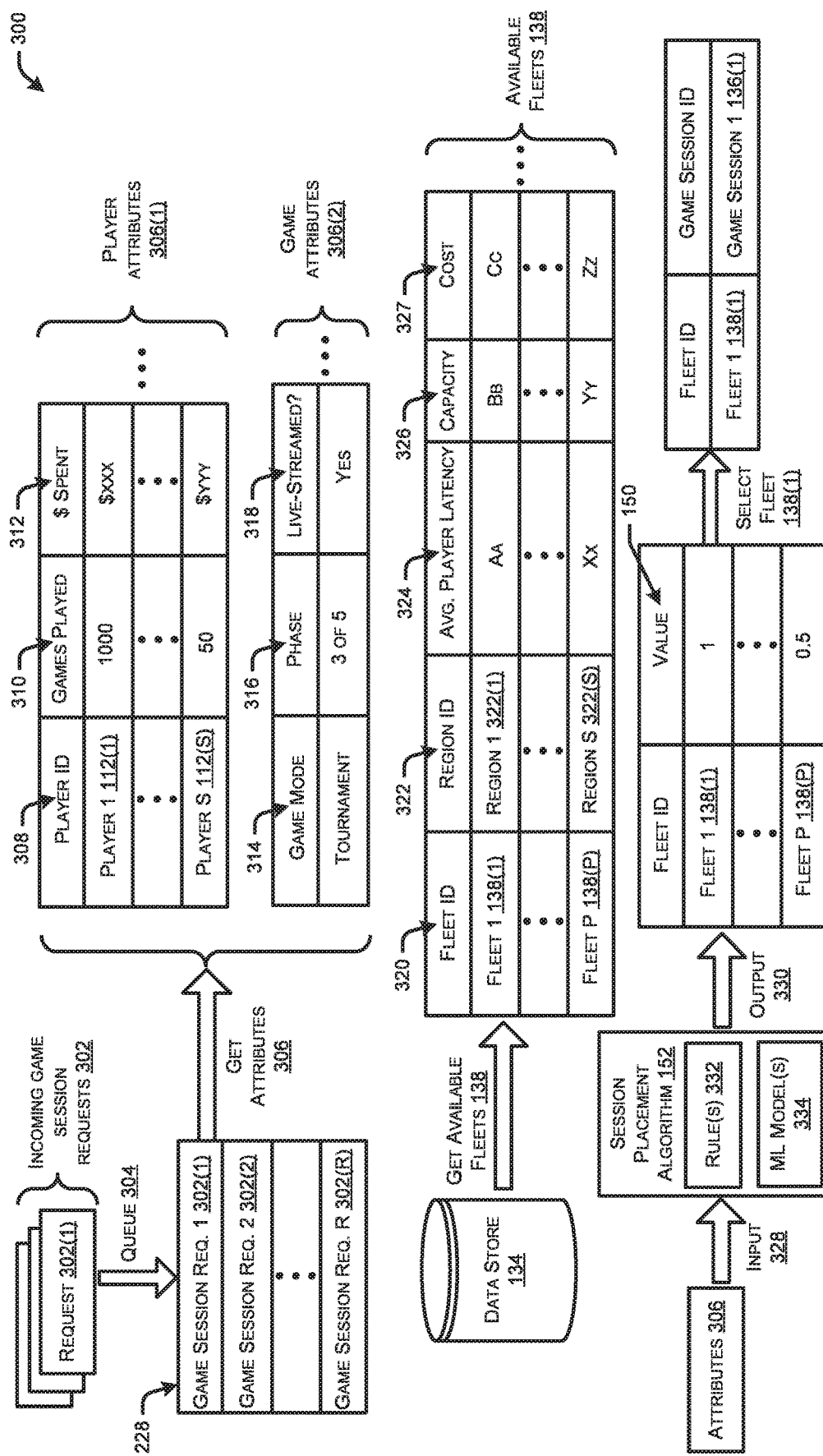
FIG. 3 illustrates a schematic diagram of an example technique, implemented by a game-hosting service, for placing game sessions on fleets of VM instances using a value-based approach.

FIG. 3 illustrates a schematic diagram 300 of an example technique, implemented by a game-hosting service 106, for placing game sessions 136 on fleets 138 of VM instances 126 using a value-based approach. Initially, the game-hosting service 106 may cause VM instances 126 to be spun up and to execute associated processes 132, at least some of which execute in idle mode so as to be available to host a new game session 136. Thus, multiple first server processes 132 may execute on a fleet 138 of VM instances 126. The fleet of instances 126 may be allocated to a particular subscriber 110 of the service provider network 102 and may be running on computing resources of the service provider network 102.

As a number, R, of incoming game session requests 302(1)-(R) are received by the game-hosting service 106, the game-hosting service 106 (e.g., via the queue component 148) may perform operations to handle the requests 302 by queuing 304 the requests 302 in a queue 228. For a given game session request 302(1) in the queue 228, the queue component 148 may make a call (e.g., an API call) to get attributes 306 of the game session request 302(1). The attributes 306 may be maintained in the attribute data 212 of the data store 134, which may be populated with attributes 306 provided by the subscriber 110 and/or attributes 306 determined by the game-hosting service 106 based on hosting game sessions on behalf of the subscriber 110. FIG. 3 illustrates an example where the attributes 306 include player attributes 306(1) and game attributes 306(2). The player attributes 306(1) may represent attributes of a set of players 112(1)-(S) associated with a first game session request 302(1), where "S" is any integer greater than or equal to 2. The player attributes 306(1) may be based at least in part on prior gameplay (e.g., prior gameplay of the players 112(1)-(S)). Consider an example where players 112(1)-(S) were grouped together in a match. In this example, the player attributes 306(1) for individual players 112 may include, without limitation, a player identifier (ID) 308, a number of games played 310 over a period of time, and an amount of money spent 312 over the period of time. As shown by the ellipses to the right of the player attributes 306(1) table, the player attributes 306(1) may include additional attributes, such as, without limitation, an amount of time spent playing games, a time(s) of day that games were played, other players 112 that were involved in a common match with the given player 112, whether a player ID is a known player ID (e.g., a famous/professional gamer, a known blogger, a game reviewer, a person with an above-threshold number of social media followers, etc.), whether the player 112 has purchased DLC, and the like. In the example of FIG. 3, the first player 112(1) has played 1000 games over a period of time, while another player 112(S) has played 50 games over the period of time. Additionally, the first player 112(1) has spent $xxx over the period of time, or a different period of time, while the other player 112(S) has spent $yyy, where "xxx" and "yyy" can be any suitable number.

The game attributes 306(2) may represent attributes of a game associated with the game session request 302(1). Consider an example where players 112(1)-(S) requested to play a tournament game, and that the tournament game includes multiple (e.g., 5) sequential phases, where the players 112 progress through each phase from Phase 1 to Phase 5. In this example, the game attributes 306(2) of the game may include, without limitation, a game mode 314, such as whether the game is to be played in a tournament mode or in casual mode, or some other mode, and if the game is to be played in tournament mode, a phase 316 of the tournament, as well as whether the game is to be live-streamed 318 (i.e., broadcast to one or more viewing users). As shown by the ellipses to the right of the game attributes 306(2) table, the game attributes 306(2) may include additional player attributes, such as, without limitation, a projected number of viewing users in the audience of a game that is to be live-streamed, and the like. In the example of FIG. 3, the game associated with the game session request 302(1) happens to be a tournament game where the players 112(1)-(S) have progressed to Phase 3 out of a total of 5 Phases, and the game is also to be live-streamed to a viewing audience.

It is to be appreciated that, in addition to player attributes 306(1) and game attributes 306(2), other types of attributes 306 may be determined. For example, the attributes 306 may further include attributes of computing devices 114 used by the players 112 associated with the game session request 302(1), such as a hardware configuration (e.g., model and/or version of graphics processing unit (GPU)), and/or a software configuration (e.g., a version of a graphics driver, etc.). The attributes 306 may further include attributes of the subscriber 110 (e.g., the developer of the game), such as number of games developed and deployed via the game-hosting service 106, a number of clients 112 in the subscriber's 110 user base, etc.

In addition to the attributes 306, the game-hosting service 106 (e.g., via the queue component 148) may make a call (e.g., an API call) to get available fleets 138 allocated to the subscriber 110 who is associated with the game session request 302(1). As shown in FIG. 3, fleet data 234 may be maintained in the data store 134 to determine the available fleets for placing a game session 136(1) corresponding to the game session request 302(1). Fleets 138 may be identified by a fleet ID 320, and each fleet 138 may comprise a set of identical VM instances 126 having identical properties. For example, the fleets 138 may vary by region 322, as well as by performance metrics, such as, without limitation, average player latency 324, capacity 326 (e.g., a number of concurrently running processes 132, or some other utilization metric), and the like. Fleets 138 may also vary by cost 327 of the individual instances 126 in the fleet 138. As shown by the ellipses to the right of the available fleets 138 table, the fleet data 234 describing properties of the available fleets 138 may include additional properties in addition to the properties specified in FIG. 3. In some cases, a fleet 138 can be characterized by way of a tiered ranking system (e.g., low-tier, mid-tier, high-tier). A high-tier fleet 138 may be a fleet 138 with an above-threshold capacity, or one that can provide a user experience at a below-threshold average player latency. Fleets 138 may be classified into low-tier, mid-tier, or high-tier based on any suitable property (e.g., performance metric(s)) to indicate which are considered to be higher-performing, or higher-quality (and/or higher cost), fleets 138 and which are considered to be lower-performing, or lower-quality (and/or lower-cost), fleets 138. As such, the user experience of the players 112 may vary depending on where the game session 136(1) is placed, and/or depending on the configuration with which the game session 136(1) is hosted (e.g., a frame rate and/or resolution at which the game is hosted, etc.).

With the attributes 306 and the available fleets 138 determined, the game-hosting service 106 (e.g., via the queue component 148) may determine one or more values 150 for the game session request 302(1) (e.g., multiple values 150, each value corresponding to an individual fleets 138) based on the attributes 306. For example, the attributes 306 may be provided as input 328 to a session placement algorithm 152, and the output 330 of the session placement algorithm 152 may include one or more values 150 indicative of a value of the game session request 302(1) and/or a preference for placing the corresponding game session 136(1) on a particular fleet 138. In the example of FIG. 3, a number of P values 150 are determined for a number of P available fleets 138.

In some embodiments, the session placement algorithm 152 may utilize one or more rules 332 to determine placement values 150 based on the attributes 306 provided as input to the session placement algorithm 152. For example, a rule 332 may specify that, if the player attributes 306(1) indicate a player 112 has played an above-threshold number of games (e.g., 1000 games or more) over a period of time, the placement value 150 for a high-tier fleet 138 may be set to a maximum value (e.g., a value of 1 on a scale [0,1]). The same rule 332, or a different rule 332, may specify that, if the player attributes 306(1) indicate that the players 112 have all played a below-threshold number of games over the period of time, the placement value 150 for a low-tier fleet 138 may be set to a maximum value (e.g., a value of 1 on a scale of [0,1]), and/or the placement value 150 for a high-tier fleet 138 may be set to a relatively lower value on the scale. In some embodiments, a rule 332 may be expressed as a function(s) (e.g., a mathematical function, such as a linear or non-linear equation) that computes a value(s) 150 based on quantifiable attributes 306 that are provided as input to the function(s). Such quantifiable attributes 306 may include, for example, a number of games played, an amount of money spent, etc. In some embodiments, a different function may be defined for each available fleet 138 in order to compute a value 150 that is specific to each fleet 138. For example, a quantifiable attribute 306 may be provided as input to a first function that computes a first value 150 for a first fleet 138(1), the quantifiable attribute 306 may also be provided as input to a second function that computes a second value 150 for a second fleet 138(2), and so on and so forth, depending on the number of available fleets 138. In this manner, the session placement algorithm 152 may determine one or more values 150 that dictate where a game session 136(1) is to be placed. For example, the queue component 148 may select the fleet 138(1) with the highest value 150 of the "P" values shown in FIG. 3 as the fleet 138(1) on which the game session 136(1) is to be placed, and an idle server process 132 executing on a VM instance 126 of the selected fleet 138(1) may be assigned to the game session 136(1) for hosting the server component of the game session 136(1).

In some embodiments, the session placement algorithm 152 may represent a machine learning model(s) 334 that is configured to receive attributes 306 as input 328 and to generate output 330 that assigns scores to available fleets 138. Machine learning generally involves processing a set of examples (called "training data") in order to train a machine learning model(s). A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on) Additionally, or alternatively, a trained machine learning model can be trained to infer a probability, or a set of probabilities, for a classification task based on unknown data received as input. In the context of the present disclosure, the unknown input 328 may be the attributes 306 (or attribute data 212), as described herein, which is associated with a game session request 302, and the trained machine learning model(s) 334 may be tasked with outputting a set of values (e.g., one, two, or more values, scores, metrics), referred to herein as placement values 150, where each placement value 150 output by the machine learning model(s) 334 is indicative of a preference for placing the game session 136 on a fleet 138 (e.g., on a fleet 138 corresponding to the placement value 150). In some embodiments, the placement value 150 may be viewed as a probability of the fleet 138 being an optimal placement for the game session 136. In the event that two or more fleets 138 have the same placement value 150, the tie may be broken by considering other factors, such as by selecting the fleet 138 with the lowest average player latency, and/or selecting the fleet 138 with the lowest-cost VM instance 126 running an idle server process(es) 132.

In examples where the session placement algorithm 152 is implemented as a trained machine learning model(s) 334, such a trained machine learning model(s) 334 may represent a single model or an ensemble of base-level machine learning models, and may be implemented as any type of machine learning model. For example, suitable machine learning models for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training data that is used to train a machine learning model(s) 334 may include various types of data. In general, training data, for machine learning can include two components: features and labels. However, the training data used to train the machine learning model(s) may be unlabeled, in some embodiments. Accordingly, the machine learning model(s) may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data, such as any of the attributes 306 described herein, and/or attributes of fleets 138 of VM instances.

Figure 4:
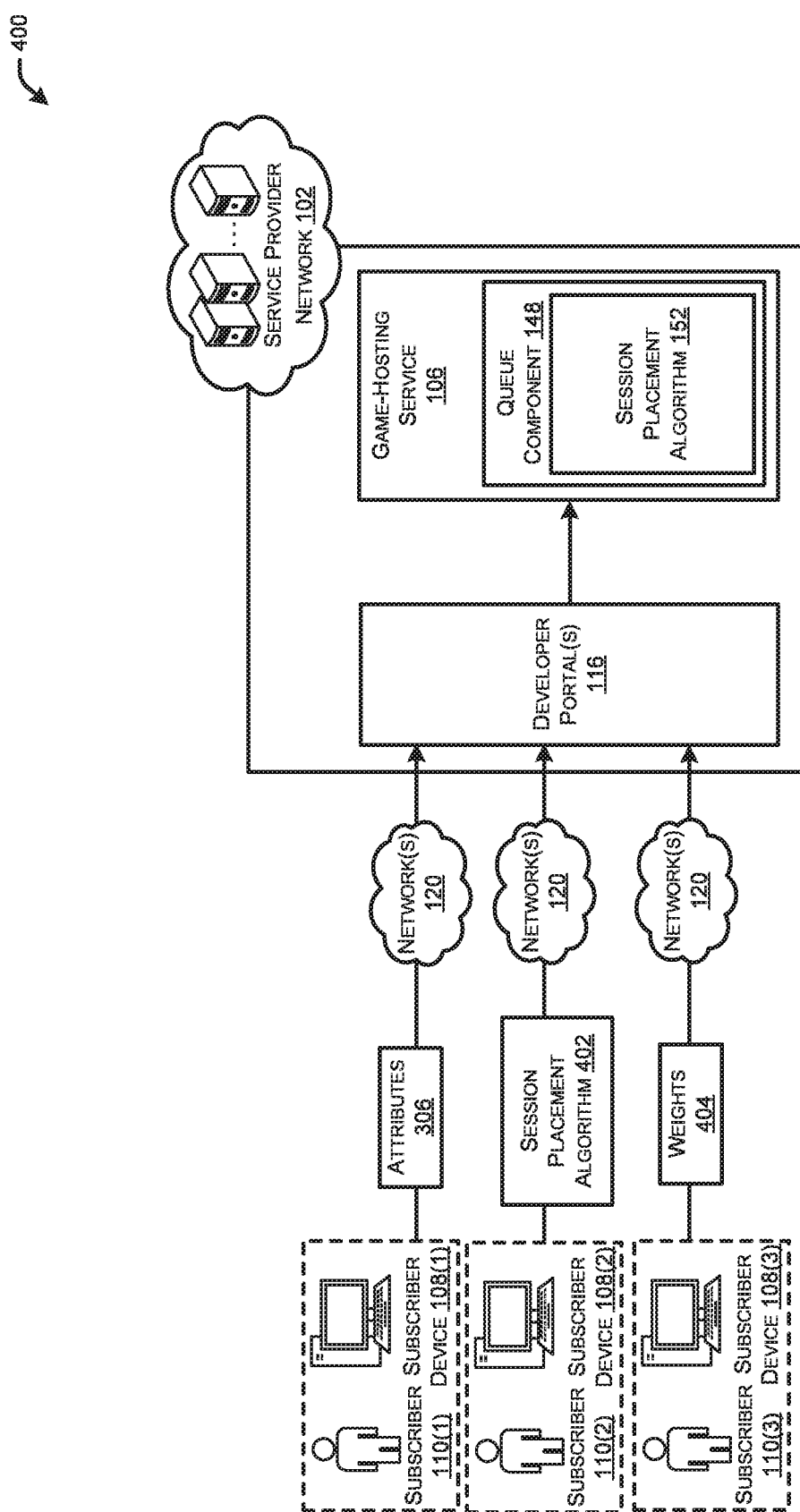
FIG. 4 illustrates a schematic diagram showing how a subscriber of the service provider network may provide data for customizing a session placement algorithm used by the game-hosting service for game session placement.

FIG. 4 illustrates a schematic diagram 400 showing how a subscriber(s) 110 of the service provider network 102 may provide data for customizing a session placement algorithm 152 used by the game-hosting service 106 (e.g., via the queue component 148) for game session placement. As mentioned, developers 110 may provide data to the game-hosting service 106 through the developer portal(s) 116, such as by uploading the data over one or more networks 120.

FIG. 4 depicts a first subscriber 110(1) using a first subscriber device 108(1) to send attributes 306 to the game-hosting service 106, such as player attributes 306(1) of their players 112 and/or game attributes 306(2) of their games. These attributes 306 may be stored as attribute data 212 and used by the session placement algorithm 152 for the subscriber 110(1) to determine placement values 150 during game session placement. In some embodiments, the subscriber-provided attributes 306 may be used to train a machine-learning model(s) 334 used as the session placement algorithm 152. FIG. 4 also depicts a second subscriber 110(2) using a second subscriber device 108(2) to send a customized session placement algorithm 402 to the game-hosting service 106. This customized algorithm 402 might be specified as a customized set of rules 332, such as rules 332 that define criteria for valuing game session requests 302 at certain placement values 150. The customized algorithm 402 might additionally, or alternatively, define a type of machine learning model(s) 334 that is to be utilized for game session placement by training the machine learning model(s) 334 on a sample set of the subscriber's 110 own data. FIG. 4 also depicts a third subscriber 110(3) using a third subscriber device 108(3) to send weights 404 to the game-hosting service 106. These weights 404 may be assigned to particular attributes 306 used for game session placement. For example, the subscriber 110(3) may choose to weight a "number of games played 310" attribute more heavily than an amount of money spent 312" attribute. With these weights 404, the session placement algorithm 152 may be customized to the subscriber's 110(3) preferences in order to place more control in the hands of the subscriber 110 for game session placement. Any or all of the data received by the game-hosting service 106 in FIG. 4 may be used to update subscriber parameter values 232 in the data store 134 so that a customized session placement algorithm 152 can be created for a subscriber 110.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
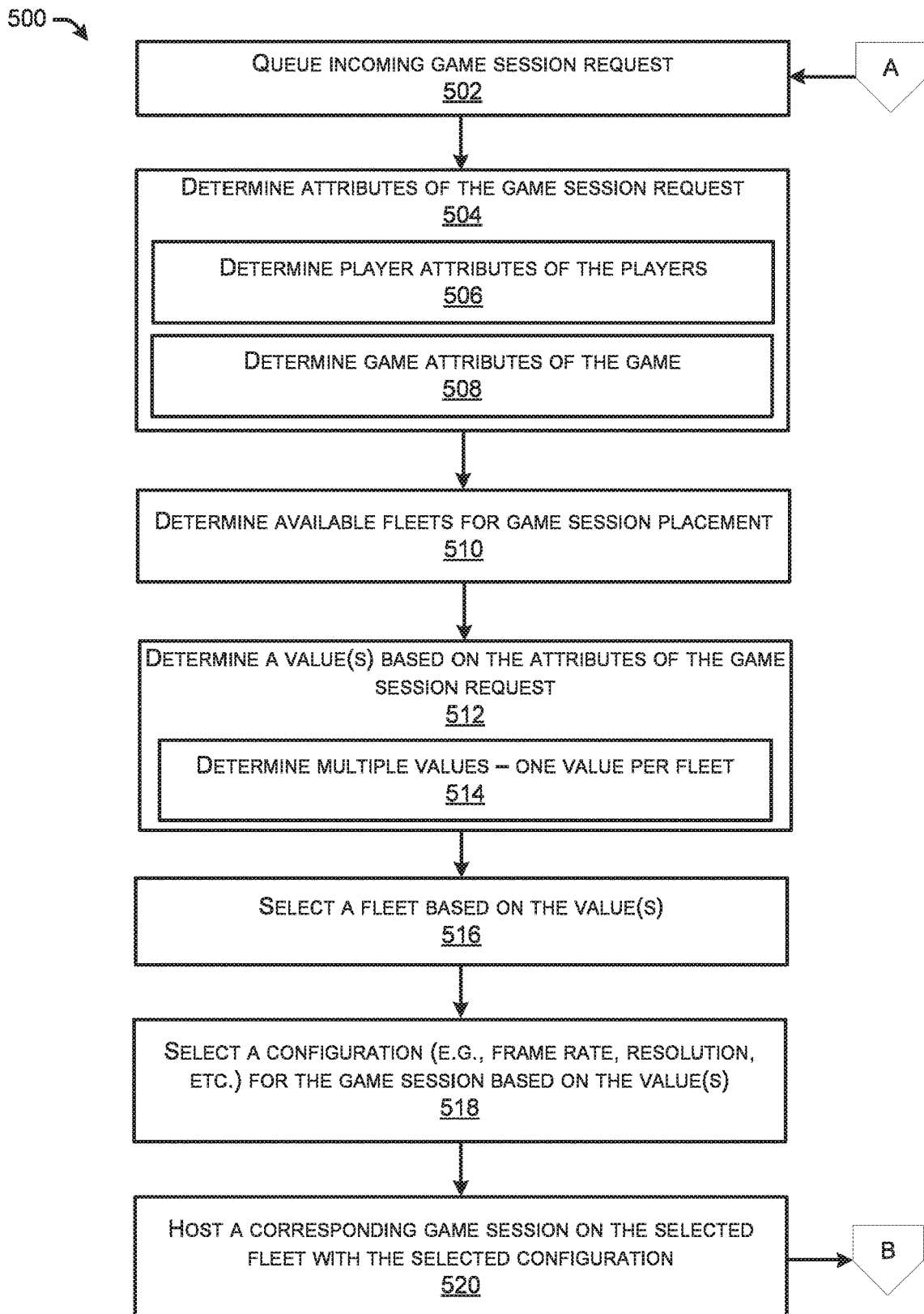
FIG. 5 illustrates a flow diagram of an example process for using a value-based approach to place a game session on a fleet of VM instances.

FIG. 5 illustrates a flow diagram of an example process 500 for using a value-based approach to place a game session 136 on a fleet 138 of VM instances 126. For discussion purposes, the process 500 is described with reference to the previous figures.

At 502, a queue component 148 of the game-hosting service 106 may queue 304 a game session request 302 in a queue 228. Said another way, the game session request 302 may be placed in a queue 228. This is depicted schematically in FIG. 3. The game session request 302 may be associated with a subscriber 110 of a service provider network 102. The subscriber 110 may represent a game developer of an online, multiplayer video game (or, game). Therefore, the game session request 302 may correspond to a game of the subscriber 110. Furthermore, the game session request 302 may be associated with a set of multiple players 112(1)-(S) who may have been matched together based on a matchmaking algorithm. Accordingly, the game session request 302 may also request player sessions for each player 112 included in the request 302.

At 504, the queue component 148 may determine one or more attributes 306 of the game session request 302 queued at block 502. The queue component 148 may access attribute data 212 (e.g., from the data store 134) in order to determine the attributes 306 at block 504. In some embodiments, the queue component 148 may make a call (e.g., an API call) to get the attributes 306 at block 504. In some examples, at least some of the attribute data 212 may have been provided by the subscriber 110 voluntarily. In some examples, at least some of the attribute data 212 may have been derived by the game-hosting service 106 from hosting past game sessions 136 on behalf of the subscriber 110. As shown by sub-blocks 506 and 508, the attributes 306 may include, without limitation, player attributes 306(1) and/or game attributes 306 (2).

Accordingly, at 506, the queue component 148 may determine player attributes 306(1) of players 112 associated with the game session request 302. As described herein, player attributes 306(1) for an individual player 112 of the set of players 112(1)-(S) may be based at least in part on prior gameplay of the player 112, and may include, without limitation, a player ID 308 (e.g., an account name, an account number, a player alias, etc.), a number of games played 310 over a period of time, whether the player 112 is a paying player (as opposed to a player that exclusively plays free-to-play games), and, if so, an amount of money spent 312 by the player 112 over the period of time, an amount of time spent playing games, a time(s) of day that games were played, other players 112 that were involved in a common match, whether a player ID is a known player ID (e.g., a famous/professional gamer, a known blogger, a game reviewer, a person with an above-threshold number of social media followers, etc.), whether the player has purchased DLC, and the like.

Additionally, or alternatively, at 508, the queue component 148 may determine game attributes 306(2) of a game corresponding to the game session request 302. Game attributes 306(2) may be indicative of a game situation, a game context, or the like, and may include, without limitation, a game mode 314 (e.g., whether a game is to be played in a tournament mode or in casual mode), and if the game is to be played in tournament mode, a phase 316 of a tournament (e.g., Phase 3 out of a total of 5 Phases), whether the game is to be live-streamed 318 (i.e., broadcast to one or more viewing users), and if so, a projected number of viewing users in the audience, and the like.

At 510, the queue component 148 may determine available fleets 138 of VM instances 126 that are allocated to the subscriber 110. The queue component 148 may access fleet data 234 (e.g., from the data store 134) in order to determine the available fleets 138 at block 510. In some embodiments, the queue component 148 may make a call (e.g., an API call) to get the available fleets 138 (or fleet data 234 pertaining thereto) at block 510. As described herein, a subscriber 110 may be allocated multiple fleets 138 of VM instances 126 that are located across disparate regions as part of a subscription to the game-hosting service 106 of the service provider network 102. Accordingly, the operations performed at block 510 may include determining at least a first fleet 138(1) of VM instances 126 (in a first region) allocated to the subscriber 110, and determining a second fleet 138(2) of VM instances 126 (in a second region) allocated to the subscriber 110. In addition, the various fleets identified at block 510 may be characterized by different performance metrics, such as latency, capacity, current utilization, etc. For example, a first fleet 138(1) (or, an available instance 126 thereon) may provide a first average latency to the players 112 associated with the request 302, a second fleet 138(2) (or, an available instance 126 thereon) may provide a second average latency to the players 112, and so on and so forth, depending on the number, P, of available fleets 138. As another example, the VM instances 126 of the available fleets 138 determined at block 510 may vary in terms of available capacity and/or current resource utilization. For example, a first fleet 138(1) may include a VM instance 126 running one process, and a second fleet 138(2) may include a VM instance 126 running multiple (e.g., four) processes. This can mean that different instances 126 of the different fleets 138 can have different capacities, where the VM instance 126 running the single process may be able to provide the snappiest response with relatively less jitter during gameplay, and the VM instance 126 running the multiple processes concurrently may have less capacity to host a new game session, yet it may be able to provide a lower cost for hosting the game session (e.g., at a relatively lower frame rate, a relatively lower resolution, etc.).

At 512, the queue component 148 may determine a value(s) 150 based at least in part on the attributes 306 of the game session request 302 determined at block 504. In some embodiments, the value(s) 150 may be determined at block 512 using a session placement algorithm 152, as described herein. A session placement algorithm 152 may be a rule-based algorithm that evaluates one or more rules 332. For example, a rule-based algorithm 152 may evaluate whether any of the players 112(1)-(S) have played an above-threshold number of games over a period of time via the game-hosting service 106, and/or whether any of the players 112(1)-(S) have spent an above-threshold amount of money over the period of time via the game-hosting service, and similar rules. Thus, one or more rules can be evaluated based on the attributes 306 at block 512. Additionally, or alternatively, a session placement algorithm 152 may be a machine-learning-based algorithm that provides the attributes 306 as input 328 to a trained machine learning model(s) 334, as described herein. The output 330 of the trained machine learning model(s) 334 may be one or more values 150 at block 512. In some embodiments, the value(s) 150 may be determined, at block 512, based at least in part on properties of the available fleets 138 specified in the fleet data 234, such as properties including, without limitation, average player latencies 324 of the available fleets 138, capacities 326 (e.g., a number of concurrently running processes 132, or some other utilization metric) of the available fleets 138, cost 327 of instances 126 in the available fleet 138, and the like.

At 514, the queue component 148 may determine multiple values 150, one value 150 per fleet 138 of the multiple available fleets 138 determined at block 510. For example, the queue component 148 may determine, based on the attributes 306, a first value 150 associated with the first fleet 138(1), a second value 150 associated with a second fleet 138(2), and possibly additional values 150 for additional fleets 138. Here, the first value 150 may be indicative of a first preference for placing the corresponding game session 136 on the first fleet 138(1), and the second value 150 may be indicative of a second preference for placing the game session 136 on the second fleet 138(2), where the second preference may be a stronger or weaker preference, or the same preference (if the multiple values 150 are equal), as the first preference.

At 516, the queue component 148 may select, based at least in part on the value(s) 150 determined at block 512, a fleet 138 (e.g., the first fleet 138(1) or the second fleet 138(2)) as a selected fleet 138. The selection at block 516 may be based at least in part on a comparison between multiple values determined at block 514 (e.g., a comparison between a first value 150 for the first fleet 138(1) and the second value 150 for the second fleet 138(2)). For example, if the first value 150 is greater than the second value 150, the queue component 148 may select the fleet 138 associated with the greater, first value 150. The selection at block 516 may be based on a comparison between fleet properties (e.g., performance metrics) of the available fleets 138 (e.g., a comparison between a first average latency that the first fleet 138(1) provides to the players 112 and a second average latency that the second fleet 138(2) provides to the players 112). Accordingly, at block 516, the queue component 148 may determine average latencies and/or other fleet/instance properties such as capacity (and/or other performance metrics), cost, etc.) of multiple fleets 138, such as a first average latency that the first fleet 138(1) provides to the players 112, a second average latency that the second fleet 138(2) provides to the players 112, and possibly additional average latencies, depending on the number of fleets 138 evaluated. If a first average latency is less than a second average latency, the queue component 148 may select the fleet 138 associated with the lower average latency (or the higher average latency, depending on how the value-based session placement is configured). In some embodiments, the value(s) 150 determined at block 512 may be based at least in part on fleet data 234 that specifies the fleet/instance properties of each available fleet 138. In this way, the selection of the fleet 138 at block 516 can be based on the value(s) 150, which, in turn, is/are based on the properties of the available fleets 138 (e.g., average latencies, capacities, costs, etc.).

At 518, the queue component 148 may select, based at least in part on the value(s) 150, a configuration of multiple available configurations as a selected configuration. For example, the queue component 148 may have a choice between hosting the game session 136 at different frame rates (e.g., 30 FPS, 15 FPS, etc.), and/or at different resolutions (e.g., 1080P, 4K, etc.). Accordingly, the selection at block 518 may involve selecting a frame rate of multiple available frame rates as a selected frame rate, and/or selecting a resolution of multiple available resolutions as a selected resolution, etc.

At 520, the queue component 148 may host a game session 136 corresponding to the game session request 302 on a VM instance 126 of the selected fleet 138, and may host the game session 136 with the selected configuration (e.g., at the selected frame rate). In order to host the game session 136 at block 520, an available process 132 spun up on the VM instance 126 may be assigned to the game session request 302, and the assigned process 132 may be instructed to host the game session 136 on the VM instance 126.

Figure 6:
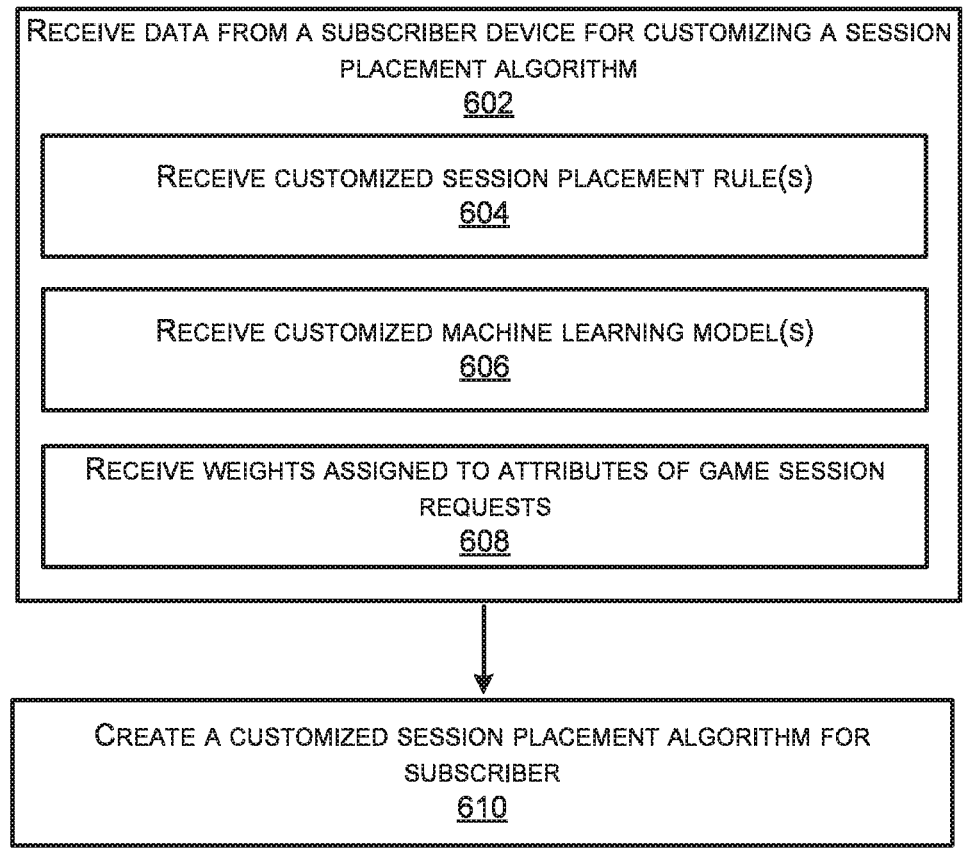
FIG. 6 illustrates a flow diagram of an example process for creating a customized session placement algorithm for a subscriber of a service provider network.

FIG. 6 illustrates a flow diagram of an example process 600 for creating a customized session placement algorithm 152 for a subscriber 110 of a service provider network 102. For discussion purposes, the process 600 is described with reference to the previous figures.

At 602, the game-hosting service 106 may receive, from a subscriber device 108 associated with a subscriber 110, data for customizing a session placement algorithm 152 used for placing game sessions 136. A schematic diagram showing examples of the data that can be provided at block 602 is depicted in FIG. 4. Accordingly, sub-blocks 604-608 are directed to example types of data that can be received at block 602 for customizing a session placement algorithm 152.

At 604, the game-hosting service 106 may receive one or more customized session placement rules 332. The customized rule(s) 332 may specify one or more criteria that are to be met, and if the one or more criteria are met, a value(s) 150 that is to be determined for an associated game session request 302. Therefore, the customized rule(s) 332 may be designed to evaluate the attributes 306 of an incoming game session request 302 to determine if the one or more criteria are met. An example rule may specify that a criterion is met if at least one player 112 has played an above-threshold number of games (e.g., over 1000 games) over a period of time. The example rule may also specify that if the criterion is met, a value 150 for the game session request 302 is to be set at a particular value (e.g., a value of 1 on a scale of [0,1].

At 606, the game-hosting service 106 may receive a customized machine learning model(s) 334. For example, the subscriber 110 may select a type of machine learning model(s), or an ensemble of models, that the subscriber 110 would like the game-hosting service 106 to utilize during value-based game session placements, as described herein.

At 608, the game-hosting service 106 may receive one or more weights assigned to individual ones of multiple attributes 306 that can be evaluated by a session placement algorithm 152 during game session placement. For example, the subscriber 110 may assign weights to particular player attributes 306(1) to indicate which player attributes 306(1) they want to influence the session placement algorithm 152, and how much they want those attributes 306(1) to influence the algorithms 152 placement determination. The subscriber 110 may assign weights to particular game attributes 306(2) in addition, or in the alternative.

At 610, the game-hosting service 106 may create a customized session placement algorithm 152 for the subscriber 110 based at least in part on the data received at block 602. For example, the game-hosting service 106 (e.g., via the queue component 148) may implement the customized session placement rules as a customized session placement algorithm 152 to determine the value(s) 150 at block 512 of the process 500, and/or the game-hosting service 106 may train a machine-learning model(s) 334 chosen by the subscriber 110 using sample data of the subscriber 110 (or sample data of another subscriber(s) 110 of the service provider network 102. As yet another example, the game-hosting service 106 may create a weighted mathematical function (e.g., a weighted summation), or may utilize the weights 404 to train a machine learning model(s) using attributes 306 as features of the training data.

Figure 7:
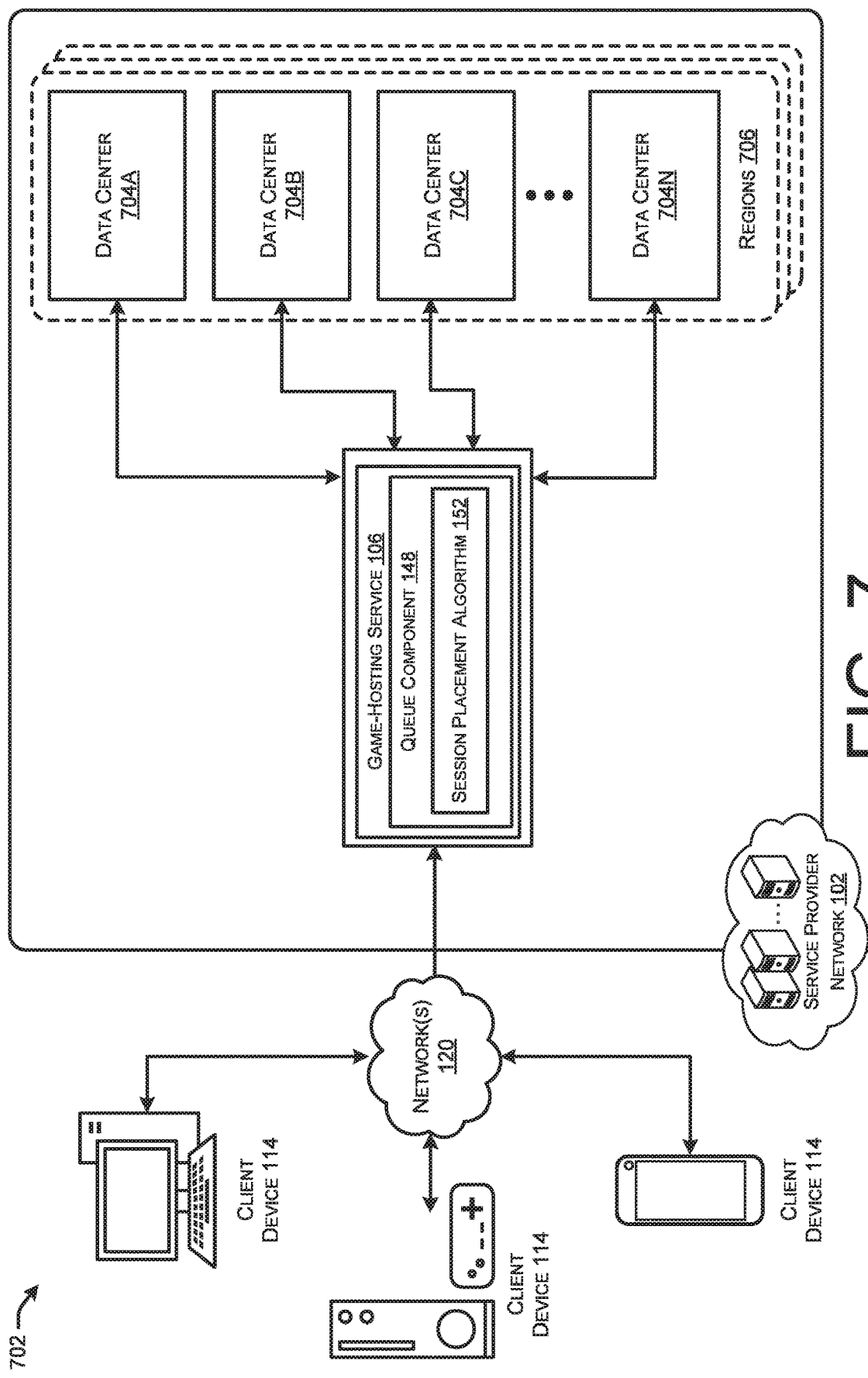
FIG. 7 is a system and network diagram that shows an illustrative operating environment that includes a service provider network that can be configured to implement aspects of the functionality described herein.

FIG. 7 is a system and network diagram that shows an illustrative operating environment 702 that includes a service provider network 102 that can be configured to implement aspects of the functionality described herein. The service provider network 102 can provide computing resources, like VM instances and storage, on a permanent or an as-needed basis. Among other types of functionality, the computing resources 122 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations, or regions 706. One illustrative embodiment for a data center 704 that can be utilized to implement the technologies disclosed herein will be described below with regard to FIG. 8.

The clients 112 and developers 110 that utilize the service provider network 102 may access the computing resources provided by the service provider network 102 over any wired and/or wireless network(s) 120, which can be a wide area communication network ("WAN"), such as the Internet, an intranet or an Internet service provider ("ISP") network or a combination of such networks. For example, and without limitation, a client device 114 operated by a client 112 of the service provider network 102 may be utilized to access the service provider network 102 by way of the network(s) 120. It should be appreciated that a local-area network ("LAN"), the Internet, or any other networking topology known in the art that connects the data centers 704 to remote clients and other users can be utilized. It should also be appreciated that combinations of such networks can also be utilized.

As illustrated, as game session requests 302 associated with clients 112 are received, a queue component 148 may queue the incoming requests 302 and process individual requests 302 to place corresponding game sessions 136 using a value-based approach. For example, the queue component 148 may utilize a session placement algorithm 152, as described herein with reference to the various embodiments.

Figure 8:
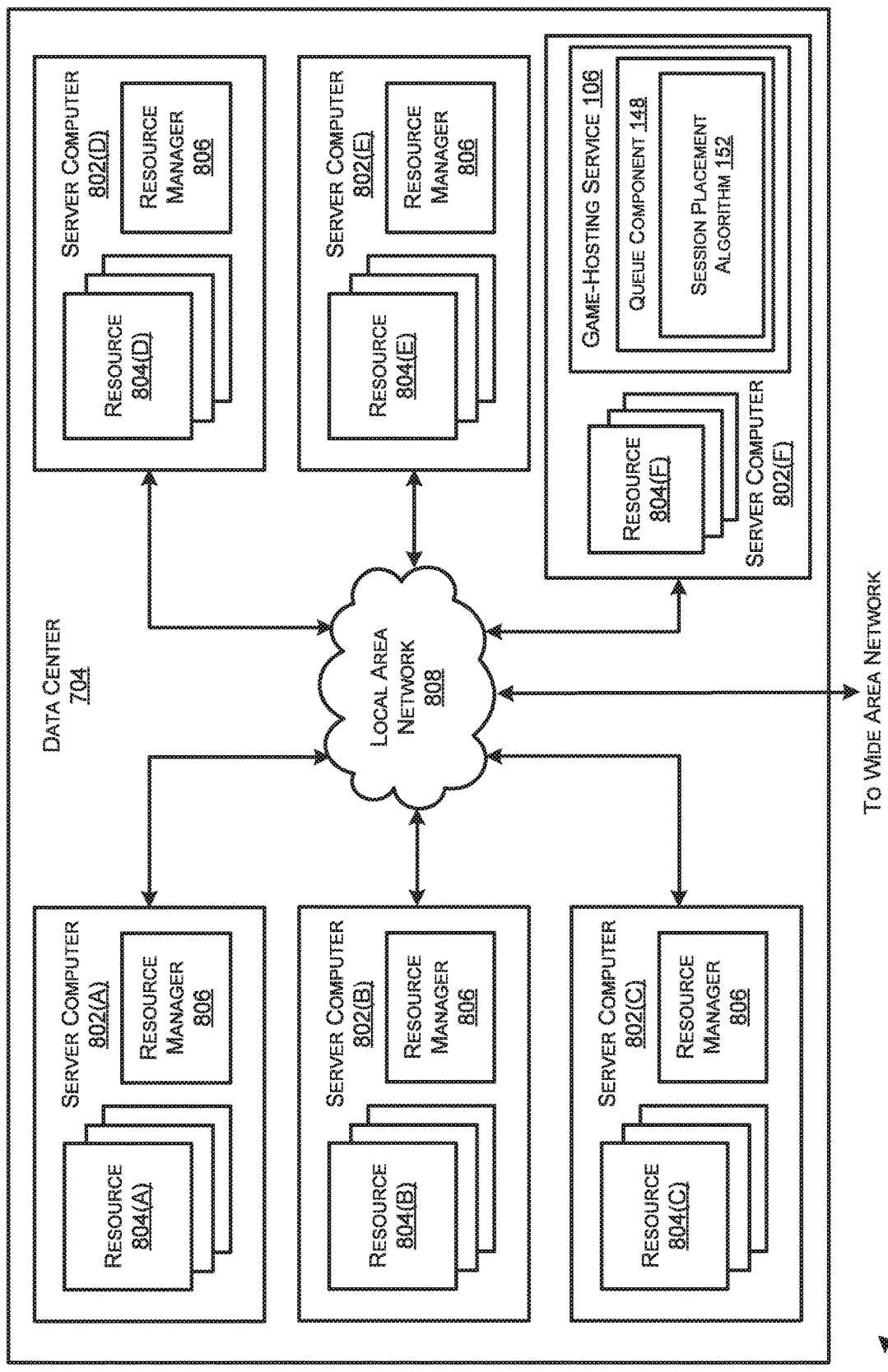
FIG. 8 is a computing system diagram illustrating a configuration for a data center that can be utilized to implement aspects of the technologies disclosed herein.

FIG. 8 is a computing system diagram 800 that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E, in some examples, the resources 804 and/or server computers 802 may include, be included in, or correspond to, the computing resource network 122 described herein.

The server computers 802 can be standard tower, rackmount, or blade server computers configured appropriately for providing the computing resources described herein (illustrated in FIG. 8 as the computing resources 804A-804E). As mentioned above, the computing resources provided by the service provider network 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

The data center 704 shown in FIG. 8 also includes a server computer 802F that can execute some or all of the software components described above. For example, and without limitation, the server computer 802F (and the other server computers 802) can generally correspond to a server configured to execute components of the game-hosting service 106 including, without limitation, the queue component 148 that implements the session placement algorithm 152, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various embodiments. Thus, the data center 704 in FIG. 8 may also include a plurality of server computers 802 that execute a fleet 138 of VM instances 126, which are executing processes 132 to host game sessions 136 for online games.

Figure 9:
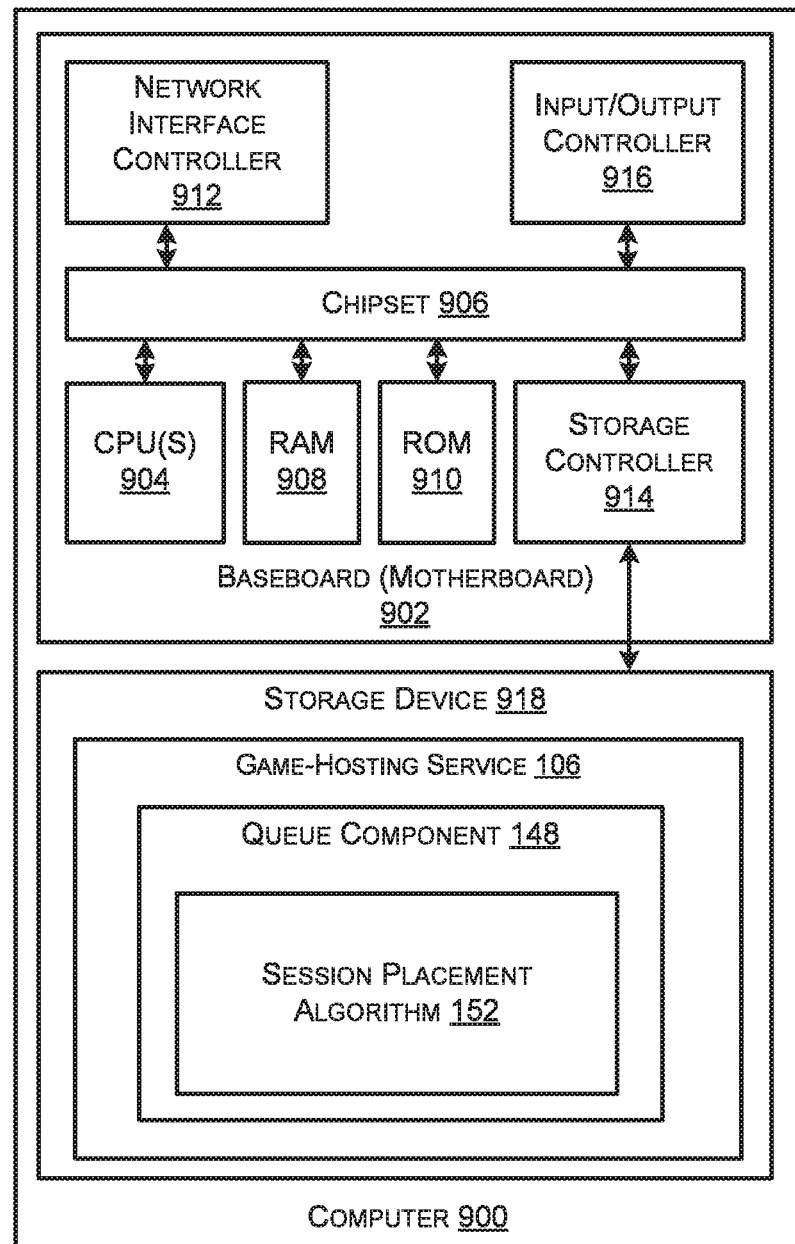
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a server computer, workstation, desktop computer, laptop, tablet, network appliance, e-reader, smartphone, or other computing device, and can be utilized to execute any of the software components presented herein. In some examples, the server computer 900 may correspond to one or more computing devices that implements the game-hosting service 106 described in FIG. 1.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtracters, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 808 (or 120). It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system, programs (e.g., the game-hosting service 106 and sub-components thereof, including, without limitation, queue component 148 that utilizes the session placement algorithm 152), and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the network-based service platform 102, and or any components included therein, may be supported by one or more devices similar to computer 900. Stated otherwise, some or all of the operations performed by the service provider network 102, and or any components included therein, may be performed by one or more computer devices 900 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 918 can store other system or application programs and data utilized by the computer 900.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-6. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9. As shown in FIG. 9, a queue component 148 may utilize a session placement algorithm 152 for game session placement, as described herein.

Figure 10:
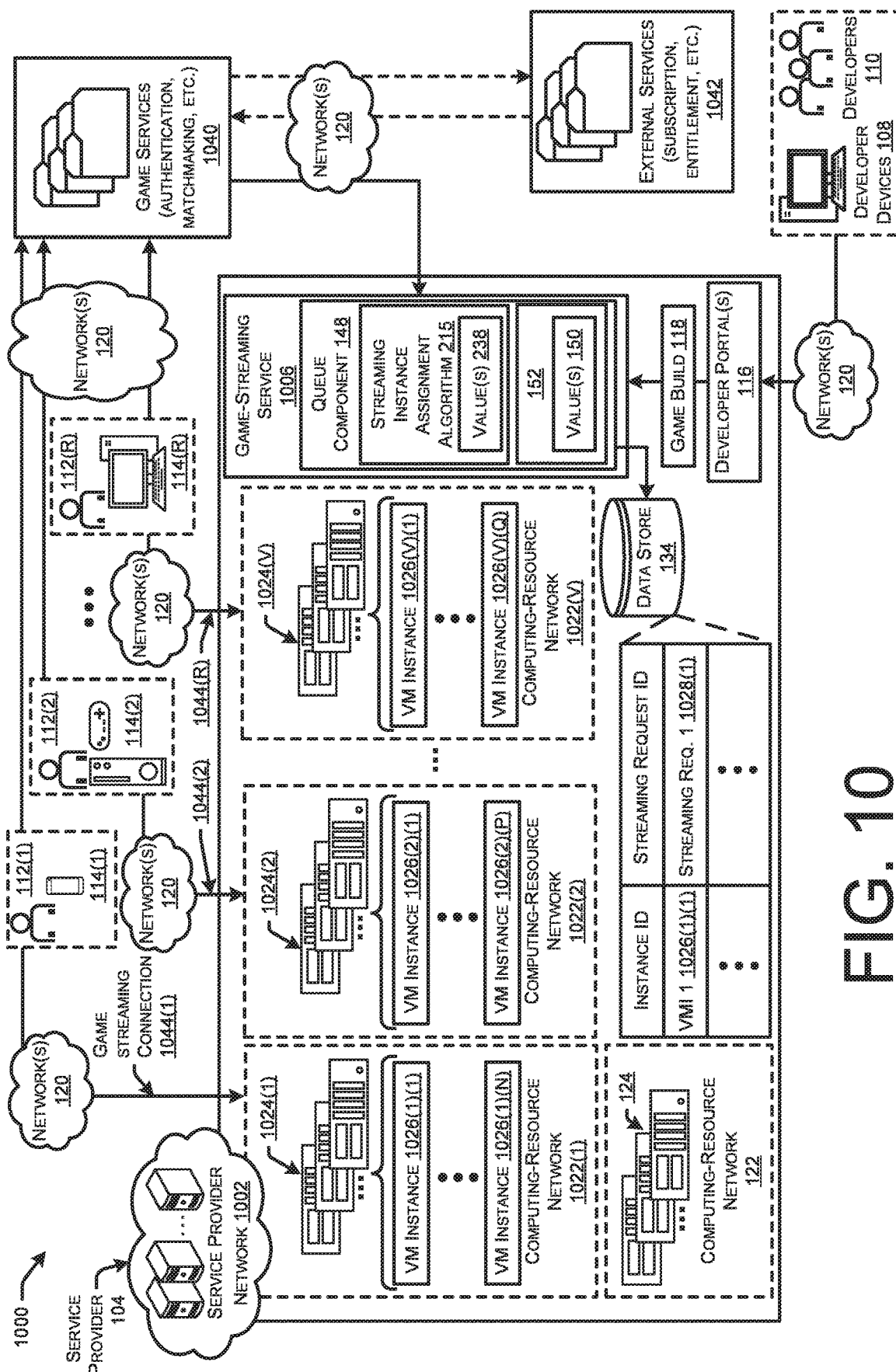
FIG. 10 illustrates a system-architecture diagram of an example environment in which a game-streaming service of a service provider network can assign VM instances to game streaming requests using a value-based approach.

FIG. 10 illustrates a system-architecture diagram of an example environment 1000 in which a game-streaming service 1006 of a service provider network 1002 can assign VM instances to game streaming requests using a value-based approach. As illustrated, the service provider network 1002 may be operated and/or managed by the service provider 104. The service provider network 1002 of FIG. 10 may be similar to the service provider network 102 described with reference to FIG. 1 in that it may provide various services to users to fulfill their computing resource needs, such as cloud-based computing resources. In this sense, the service provider network 1002 may include some or all of the components and/or functionality of the service provider network 102 described elsewhere herein. Furthermore, as illustrated in FIG. 10, the service provider network 1002 may also provide a game-streaming service 1006 that is a scalable, cloud-based runtime environment for streaming games to client devices 114 of players 112. The game-streaming service 1006 may be implemented as part of, or in conjunction with, the game-hosting service 106 of FIG. 1 in order to deploy, operate, and scale streaming servers and session-based multiplayer game servers in a cloud-based, or network-based, environment. For example, the game-streaming service 1006 may provide the hardware to stream games to client devices 114, to host the game sessions for multiple players involved in a game session, and to manage ongoing activity, security, storage, and performance tracking. Additionally, the game-streaming service 106 may provide auto-scaling capabilities such that instances supporting game streaming and/or instances supporting game sessions can be spun up or spun down based on player demand.

Once a subscriber/developer 110 has uploaded their game build 118 via the developer portal 116, the game-streaming service 1006 may deploy game software (e.g., the game software 130 shown in FIG. 1) for the subscriber's game to one or more game servers 124 in the computing-resource network 122. Reference can be made to FIG. 1 for an understanding of the one or more game servers 124 and their operation for hosting game sessions 136.

FIG. 10 also depicts computing-resource networks 1022(1)-(V), where "V" is any integer greater than or equal to 2 (referred to herein collectively as "computing-resource networks 1022"). These computing-resource networks 1022 may include data centers that each include one or more computing resources, such as VM instances 1026. Although the computing-resource networks 1022(1)-(V) are shown separately in FIG. 10, it is to be appreciated that the computing-resource networks 1022(1)-(V) may represent one or multiple computing-resource networks 1022. Computing-resource network 1022(1) is shown as including one or more VM instances 1026(1)(1) to 1026(1)(N), where "N" is any suitable integer, computing-resource network 1022(2) is shown as including one or more VM instances 1026(2)(1) to 1026(2)(P), where "P" is any suitable integer, and computing-resource network 1022(V) is shown as including one or more VM instances 1026(V)(1) to 1026(V)(Q), where "Q" is any suitable integer. The data centers in the computing-resource networks 1022(1)-(V) may house game server(s) 1024(1)-(V) and may be located across disparate geographical regions such that computing resources are available to support functionality for cloud-based services provided by the service provider network 1002. The servers 1024 may be used for streaming games to client devices 114 of players 112, such as by executing a VM instance(s) 1026 to render frames and to send the frames to a client device 114, as well as for receiving control data from the client device 114 based on a player(s) 112 proving user input to the client device 114. The computing resources of a computing resource network 1022 may include various combinations of hardware-based components, such as CPU, GPU, memory, storage, network capacity, security, and/or any other type of hardware-based resource to support cloud-based services, such as the game-streaming service 1006. In some examples, a computing resource network 1022 may further include respective memories that store various firmware-based and/or software-based resources that provide the functionality of the services, such as the instances 1026. Similar to the description of FIG. 1, a VM instance 1026 may execute an agent 128, the game software 130 of a subscriber's 110 game, and/or one or more processes 132 to support streaming a game to a client device 114. An agent 128 may be responsible for handling various processes on an instance 1026, such as spinning up an instance 1026, spinning down an instance 1026, handling lifetime processes of the instance 1026, retrieving game streaming assignments for processes 132 executing on the instance 1026, executing processes 132 on the instance 1026 to stream a game to a client device 114, managing resources of the instance 1026, installing patches and/or other software on the instance 1026 and/or various other actions for managing the instance 126.

FIG. 10 also depicts the data store 134 described in FIG. 1. The data store 134 may, among other things, keep track of the assignment of VM instances 1026 to game streaming requests. To request to stream a game, players 112 may utilize their client devices 114 (e.g., applications, software, or other programs executing thereon) to request (e.g., via an API call) that the game-streaming service 1006 assign them a VM instance 1026 for streaming the game to their client devices 114. Accordingly, upon receiving a game streaming request, the game-streaming service 1006 may be tasked with identifying and selecting a VM instance 1026 to serve as a "streaming instance" for streaming the game to the client device 114 of the player 112 associated with the incoming game streaming request. The game-streaming service 1006 may have already spun up VM instances 1026 that are allocated for various subscribers 110 of the service provider network 1002, and each of the spun up VM instances 1026 may have server processes 132 executing thereon in idle mode until the processes 132 are assigned to a game streaming request for streaming a game to a client device 114 until a corresponding game session 136 ends. Other than loading maps and other data for streaming a particular game, these idle processes 132 may be ready to start streaming a game as soon as they are assigned to a game streaming request. The game-streaming service 1006 may be tasked with assigning an available VM instance 1026 allocated to a subscriber 110, and to identify a server process 132 executing on the selected VM instance 1026, which will serve a player 112 who is streaming a game to his/her client device 114.

The assignment of a VM instance 1026 to a game streaming request may be a first phase of a two-phase process. A second phase of the two-phase process may be placing a corresponding game session 136 (e.g., for multiple players 112 including the player 112 who is streaming the game) on a fleet 138 of a game server 124, as described herein. When a game session 136 is created, the assigned process 132 executing on a VM instance 126 of the selected fleet 138 may be instructed to host support) the created game session 136 for one or more clients 112 of the subscriber 110 that are associated with the game session 136, and the game may be streamed to one or more of the client devices 114 of the clients 112 involved in the game session 136. The client application(s) running on the client device(s) 114 associated with the game session may receive connection information (e.g., a port of a server 1024, an IP address, etc.), and may create a game streaming connection(s) 1044 by connecting directly, over the network(s) 120, to the open game streaming server 1024 using a player session ID(s). The VM instance 1026 used for streaming the game may then receive connection information (e.g., a port of a server 124, an IP address, etc.), and may create a connection(s) by connecting directly to the open game server 124 using the player session ID(s). If connected, the player session is set to active and the client(s) 112 begins playing the game that is being streamed to their client device(s) 114 and the game streaming connection 1044 that is established between the game streaming server 1024 that has the instance 1026 with the process 132 executing to stream the game (e.g., render frames, send the frames to the client device 114, receive control data, etc.). FIG. 10 depicts separate game streaming connections 1044(1), 1044(2), and 1044(R) for client devices 114(1), 114(2), and 114(R), respectively, which may connect each client device 114 to its own, dedicated streaming VM instance 1026. Meanwhile, the server process 132 executing on an instance 126 of a game server 124 may host the game session 136 for multiple players. Once a game session 136 has ended (e.g., clients 112 quit, the game ends, time out, etc.), the client application on each of the involved client devices 114 may disconnect from the process 132, and the game-streaming service 1006 can change the game session 136 to terminated, upload a game session log to storage, and update a fleet utilization to indicate that the game servers 1024 and 1024 have one less process executing 132.

The value-based streaming instance assignment techniques described herein may be implemented, at least in part, by the queue component 148 described herein, and/or possibly by another component of the game-streaming service 1006. The queue component 148 may receive incoming game streaming request associated with a player 112 who is requesting to stream a game to his/her client device 114. This player 112 may also request to be matched with other players for playing the game in multiplayer mode. The queue component 148 may place incoming game streaming requests in a queue and may process each game streaming request to identify a VM instance 1026 to assign to the game streaming request. When a queued game streaming request is processed for assigning a VM instance 1026 thereto, the queue component 148 may determine attributes of the game streaming request, which are used to determine (e.g., compute, calculate) one or more values 238 for streaming instance assignment. The value(s) 238 is/are sometimes referred to herein as a "instance assignment value(s) 238" because the value(s) 238 dictate(s) from where a game is to be streamed to a client device 114. The attributes of the game session request that are used to determine the value(s) 238 may include, without limitation, player attributes 306(1), game attributes 306(2), and/or other types of attributes, which are described in detail herein.

The queue component 148 may also determine available VM instances 1026 that are allocated to the subscriber 110 associated with the game streaming request, and may utilize a streaming instance assignment algorithm 215 to determine (e.g., calculate, compute, etc.) the value(s) 238 for streaming instance assignment. The available VM instances 1026 may be located across disparate geographical regions, and each may have different performance characteristics based on the region and/or based on the specific hardware and/or configurations of the VM instances 1026. For example, latency may vary across a set of available VM instances 1026 for game streaming such that a first VM instance 1026(1)(1) provides relatively lower latency to a client device 114(1) and a second VM instance 1026(2)(1) provides relatively higher latency to the client device 114(1), or vice versa. This can be based on various factors, as mentioned. In some cases, the available VM instances 1026(1)(1) to 1026(V)(Q) may vary in terms of available capacity and/or current resource utilization. For example, a first VM instance 1026 (1)(1) may be running one process, and a second VM instance 1026(2)(1) may be running multiple (e.g., four) processes. This can mean that different instances 1026 can have different capacities, where the VM instance 1026 running the single process may be able to provide the snappiest response with relatively less jitter during game streaming, and the VM instance 1026 running the multiple processes concurrently may have less capacity to stream a game to the client device 114(1), yet it may be able to provide a lower cost for streaming the game (e.g., at a relatively lower frame rate). It is to be appreciated that the streaming instance assignment algorithm 215 may be customized by the subscriber 110 in a similar manner to customization of the session placement algorithm 152 described with reference to FIGS. 4 and 6 herein.

The value(s) 238 is/are used to select a VM instances 1026 for streaming a game to a given client device 114 associated with the game streaming request. In some embodiments, a single value 238 (e.g., a score, a metric, etc.) determined from the attributes of a game streaming request may represent a value within a range of possible values at which a variable can be set, where a maximum value of the range may be indicative of a high-value game streaming request and/or a strong preference for streaming the game using a particular VM instance 1026, and a minimum value of the range may be indicative of a low-value game streaming request and/or a weak preference for streaming the game using a particular VM instances 1026. In some embodiments, a single value 238 determined from the attributes of a game streaming request may represent a dollar value (e.g., $0.50, $1.50, etc.) that may be indicative of a monetary value attributable to an entity (e.g., the game developer) that stands to benefit from streaming the game to a given client device 114 using a particular VM instance 1026.

In some embodiments, the attributes of a game streaming request can be used to determine multiple values 238, where each value 238 of the multiple values 238 corresponds to an individual VM instance 1026 of multiple VM instances 1026 that are available for game streaming. For example, a first value 238 may be determined for a first VM instance 1026(1)(1), the first value 238 being indicative of a preference for streaming a game to a client device 114 using the first VM instance 1026(1)(1), a second value 238 may be determined for a second VM instance 1026(2)(1), the second value 238 being indicative of a preference for streaming a game to a client device 114 using the second VM instance 1026(2)(1), and so on and so forth, depending on the number of instances 1026 that might be available for game streaming. In the case of determining multiple placement values 238, the values 238 can represent any suitable type of value. For example, the multiple values 238 may comprise multiple Boolean values (e.g., true or false, yes or no) that indicate whether it is preferable to stream a game to a client device 114 using a given VM instance (VMI) 1026 or not (e.g., VMI 1: Yes, VMI 2: No, etc.). In other examples, the values 238 may be numerical values within a defined range of values (e.g., a range of [0,100], a normalized range of [0,1], etc.), where the range may be indicative of a weak-to-strong preference for streaming a game to a client device 114 using a given VM instance 1026 to which the value 238 is assigned.

As mentioned, the assignment of a streaming instance 1026 may be a first phase of a multi-phase process. In this example, the queue component 148, as part of a second phase, may select a fleet 138 based on a placement value(s) 150 determined for the available fleets 138, and a corresponding game session 136 may be hosted on a VM instance 126 of the selected first fleet 138(1) by identifying an idle server process 132 on the VM instance 126 and instructing the server process 132 to host the game session 136. As game sessions 136 are placed and as streaming instances 1026 are assigned to stream games to particular client devices 114, the assignments and the placements may be stored in the data store 134, at least until the game sessions 136 are terminated. For example, FIG. 10 illustrates an example where a first VM instance (VMI) 1026(1)(1) has been assigned to a first game streaming request 1028(1). As shown by the ellipses in the data store 134 table of FIG. 10, the data store 134 may maintain additional streaming instance assignments that have been made. Example details of the streaming instance assignment algorithms 215 that can be used by the queue component 148 for value-based game streaming instance assignment are described in further detail with reference to the following figures. In general, the streaming instance assignment algorithm 215 accounts for the attributes of a game streaming request in determining the value(s) 238 for streaming instance assignment.

In an illustrative example, an incoming game streaming request 1028 may be associated with player attributes that indicate a player 112 associated with the game streaming request 1028 has played an above-threshold number (e.g., over 1000) of games within a period of time (e.g., within the past 6 months). In this example, the streaming instance assignment algorithm 215—using a rule-based approach, a machine-learning model(s), etc.—might determine a relatively-high value 238 for this game streaming request 1028 in order to assign, to the game streaming request 1028, a VM instance 1026 that can provide relatively-high performance (e.g., low latency, or an otherwise "snappy" streaming experience) to the client device 114 of the player 112 of the game streaming request. In another illustrative example, another incoming game streaming request 1028 may be associated with game attributes that indicate a game is to be live-streamed to an audience, and the streaming instance assignment algorithm 215 using a rule-based approach, a machine-learning model(s), etc.—may determine a relatively-high value 238 for this game streaming request 1028 in order to assign, to the game streaming request 1028, a VM instance 1026 that can provide relatively-high performance (e.g., low latency, or an otherwise "snappy" streaming experience) to the client device 114 of the player 112 of the game streaming request. By contrast, yet another incoming game streaming request may be associated with a player 112 who is a non-paying player of a casual, free-to-play game. Given these player attributes and game attributes of the game streaming request 1028, the streaming instance assignment algorithm 215—using a rule-based approach, a machine-learning model(s), etc.—may determine a relatively-low value 238 for this game streaming request 1028 in terms of assigning, to the game streaming request 1028, a high-performance 1026, and/or the value(s) 238 may include a relatively-high instance assignment value 238 for a low-performance VM instance 1026 that is indicative of a strong preference for assigning, to the game streaming request 1028, a VM instance 1026 that provides relatively-low performance (e.g., higher latency, as compared to other available VM instances 1026), perhaps at a lower cost (to the subscriber 110) of streaming the game to the given client device 114. Assigning, to the game streaming request 1028, a low-performance VM instance 1026 and/or streaming the game with a low-performance configuration (e.g., a relatively low frame rate, a relatively low resolution, etc.) may allow for streaming to more client devices 114 using a single server process 132 and/or a single VM instance 1026 to lower the cost (to the subscribing game developer 110) of streaming the game to client devices 114 of its clients 112, thereby providing a cost savings for the developer 110.

In some embodiments, the value(s) 238 may be recalculated during a game session 136 as attributes 306 change after a start of the game session 136. Based on a recalculated value(s) 238, a game may be streamed using a different VM instance 1026, such as by transferring the stream from a streaming process 132 on a first VM instance 1026(1)(1) to a different streaming process 132 on a second VM instance 1026(2)(1) where the game streaming is resumed on the second VM instance 1026(2)(1). To avoid an interruption in service to the player 112, a real-time data migration procedure may be employed to transfer the streaming of the game with little-to-no interruption.

Figure 11:
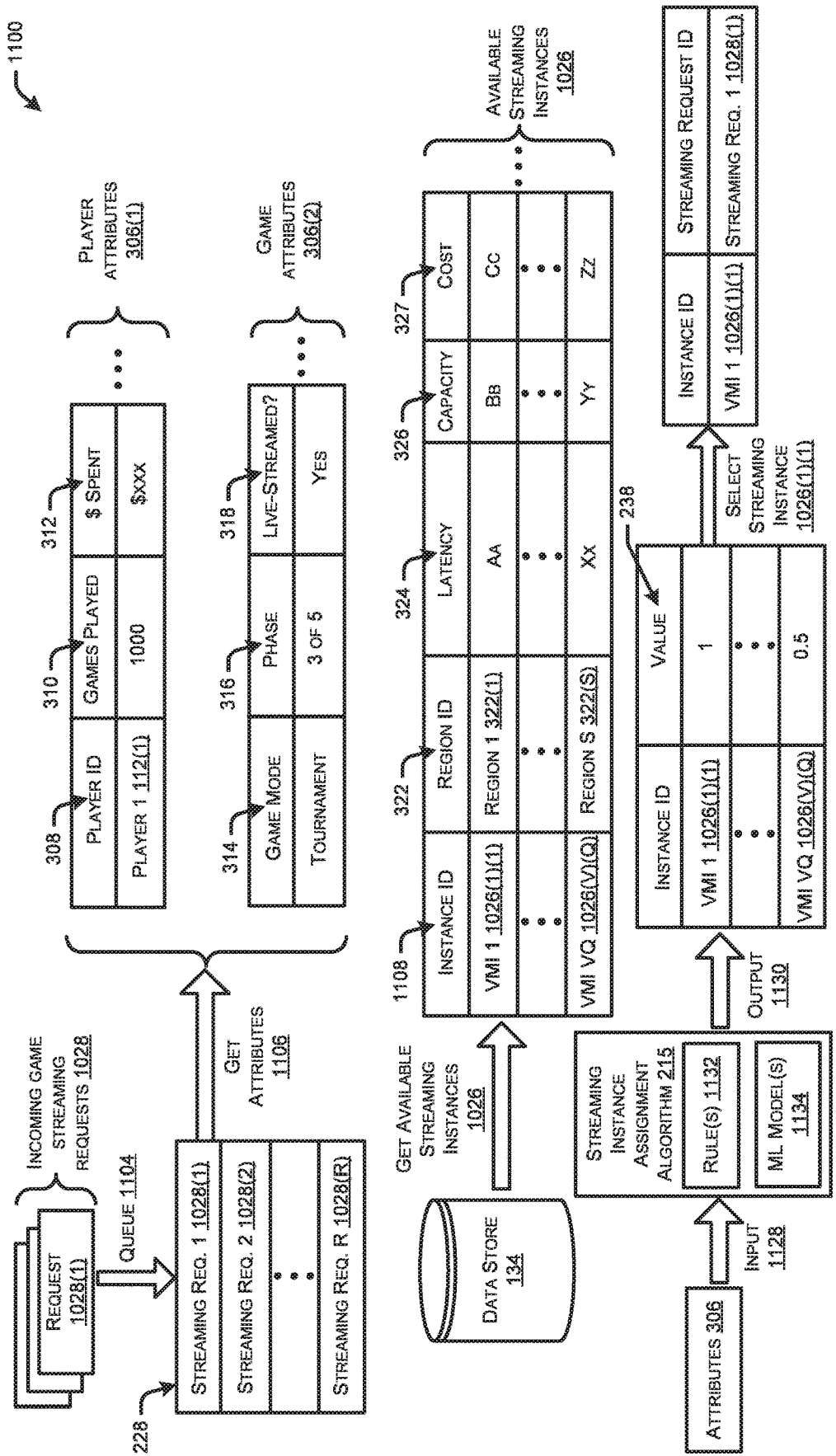
FIG. 11 illustrates a schematic diagram of an example technique, implemented by a game-streaming service, for assigning VM instances to game streaming requests using a value-based approach.

FIG. 11 illustrates a schematic diagram 1100 of an example technique, implemented by a game-streaming service 1006, for assigning VM instances 1026 to game streaming requests 1028 using a value-based approach. Initially, the game-streaming service 1006 may cause VM instances 1026 to be spun up and to execute associated processes 132, at least some of which execute in idle mode so as to be available to stream a game(s) to a client device 114 as part of a game session 136. Thus, multiple first server processes 132 may execute on VM instances 1026. The VM instances 1026 may be allocated to a particular subscriber 110 of the service provider network 1002 and may be running on computing resources of the service provider network 1002.

As a number, R, of incoming game streaming requests 1028(1)-(R) are received by the game-streaming service 1006, the game-streaming service 1006 (e.g., via the queue component 148) may perform operations to handle the requests 1028 by queuing 1104 the requests 1028 in a queue 228. For a given game streaming request 1028(1) in the queue 228, the queue component 148 may make a call (e.g., an API call) to get attributes 306 of the game streaming request 1028(1). The attributes 306 may include, without limitation, player attributes 306(1) (e.g., player attributes 306(1) based at least in part on prior gameplay of the player 112(1)) and game attributes 306(2). Since these attributes are described in detail with reference to at least FIG. 3, the attributes 306 will not be described in further detail here for the sake of brevity. In some embodiments, the game streaming request 1028(1) may be associated with a single player 112(1), and, in these embodiments, the player attributes 306(1) may represent attributes of the single player 112(1) associated with a game streaming request 1028(1). In some embodiments, the attributes 306 may be determined prior to the player 112(1) being grouped together with one or more other players 112 in a match.

In addition to the attributes 306, the game-streaming service 1006 (e.g., via the queue component 148) may make a call (e.g., an API call) to get available VM instances 1026 (sometimes referred to as "streaming instances 1026") for streaming a corresponding game to a client device 114(1) of the player 112(1) associated with the game streaming request 1028(1). The available VM instances 1026 may be allocated to the subscriber 110 who is associated with the game streaming request 1028(1). As shown in FIG. 11, streaming instance data 236 may be maintained in the data store 134 to determine the available VM instances 1026 for streaming the game to a client device 114. VM instances (VMIs) 1026 may be identified by an instance ID 1108, and each VM instance 1026 in the set of available VM instances 1026(1)(1) to 1026(V)(Q) may vary by region 322, as well as by performance metrics, such as, without limitation, latency 324 relative to the client device 114, capacity 326 (e.g., a number of concurrently running processes 132, or some other utilization metric), and the like. VM instances 1026 may also vary by cost 327 of the instances 1026. As shown by the ellipses to the right of the available streaming instances 1026 table, the streaming instance data 236 describing properties of the available VM instances 1026 may include additional properties in addition to the properties specified in FIG. 11. In some cases, a VM instance 1026 can be characterized by way of a tiered ranking system (e.g., low-tier, mid-tier, high-tier). A high-tier VM instance 1026 may be a VM instance 1026 with an above-threshold capacity, or one that can provide a user experience at a below-threshold latency to the client device 114. VM instances 1026 may be classified into low-tier, mid-tier, or high-tier based on any suitable property (e.g., performance metric(s)) to indicate which are considered to be higher-performing, or higher-quality (and/or higher cost), VM instances 1026 and which are considered to be lower-performing, or lower-quality (and/or lower-cost), VM instances 1026. As such, the user experience of the players 112 may vary depending on which VM instance 1026 is selected for streaming the game to the player's 112 client device 114, and/or depending on the configuration with which the game is streamed (e.g., a frame rate and/or resolution at which the game is streamed, etc.).

With the attributes 306 and the available VM instances 1026 determined, the game-streaming service 1006 (e.g., via the queue component 148) may determine one or more values 238 for the game streaming request 1028(1) (e.g., multiple values 238, each value corresponding to an individual VM instance 1026) based on the attributes 306. For example, the attributes 306 may be provided as input 1128 to a streaming instance assignment algorithm 215, and the output 1130 of the streaming instance assignment algorithm 215 may include one or more values 238 indicative of a value of the game streaming request 1028(1) and/or a preference for a preference for streaming the game to a client device 114(1) of the player 112(1) using a particular VM instance 1026. In the example of FIG. 11, a number of values 238 are determined for an equivalent number of available VM instances 1026.

In some embodiments, the streaming instance assignment algorithm 215 may utilize one or more rules 1132 to determine instance assignment values 238 based on the attributes 306 provided as input to the streaming instance assignment algorithm 215. For example, a rule 1132 may specify that, if the player attributes 306(1) indicate the player 112(1) associated with the game streaming request 1028(1) has played an above-threshold number of games (e.g., 1000 games or more) over a period of time, the instance assignment value 238 for a high-tier VM instance 1026 may be set to a maximum value (e.g., a value of 1 on a scale [0,1]). The same rule 1132, or a different rule 1132, may specify that, if the player attributes 306(1) indicate that the player 112(1) has played a below-threshold number of games over the period of time, the instance assignment value 238 for a low-tier VM instance 1026 may be set to a maximum value (e.g., a value of 1 on a scale of [0,1]), and/or the instance assignment value 238 for a high-tier VM instance 1026 may be set to a relatively lower value on the scale. In some embodiments, a rule 1132 may be expressed as a function(s) (e.g., a mathematical function, such as a linear or non-linear equation) that computes a value(s) 238 based on quantifiable attributes 306 that are provided as input to the function(s).

Such quantifiable attributes 306 may include, for example, a number of games played by the player 112(1), an amount of money spent by the player 112(1), etc. In some embodiments, a different function may be defined for each available VM instance 1026 in order to compute a value 238 that is specific to each VM instance 1026. For example, a quantifiable attribute 306 may be provided as input to a first function that computes a first value 238 for a first VM instance 1026(1)(1), the quantifiable attribute 306 may also be provided as input to a second function that computes a second value 238 for a second VM instance 1026(2)(1), and so on and so forth, depending on the number of available VM instances 1026. In this manner, the streaming instance assignment algorithm 215 may determine one or more values 238 that dictate which VM instance 1026 is to stream the game to the client device 114(1) of the player 112(1). For example, the queue component 148 may select the VM instance 1026(1)(1) with the highest value 238 of the set of values shown in FIG. 11 as the VM instance 1026(1)(1) that is to stream the game to the player's 112(1) client device 114(1) as part of a corresponding game session 136(1), and an idle server process 132 executing on the selected VM instance 1026(1)(1) may be assigned to stream the game by rendering frames, sending the frames to the client device 114(1), and receiving control input data from the client device 114(1).

In some embodiments, the streaming instance assignment algorithm 215 may represent a machine learning model(s) 1134 that is configured to receive attributes 306 as input 1128 and to generate output 1130 that assigns scores to available VM instances 1026. Machine learning is described in detail elsewhere herein and will not be described in further detail here for the sake of brevity. Ultimately, one of the VM instances 1026(1)(1) is selected as a selected VM instance 1026(1)(1) for streaming the game to the client device 114(1) of the player 112(1) associated with the game streaming request 1028(1). Accordingly, as shown in FIG. 11, the selected. VM instance 1026(1)(1) can be assigned to the game streaming request 1028(1) based at least in part on the value(s) 238 determined using the streaming instance assignment algorithm 215.

Figure 12:
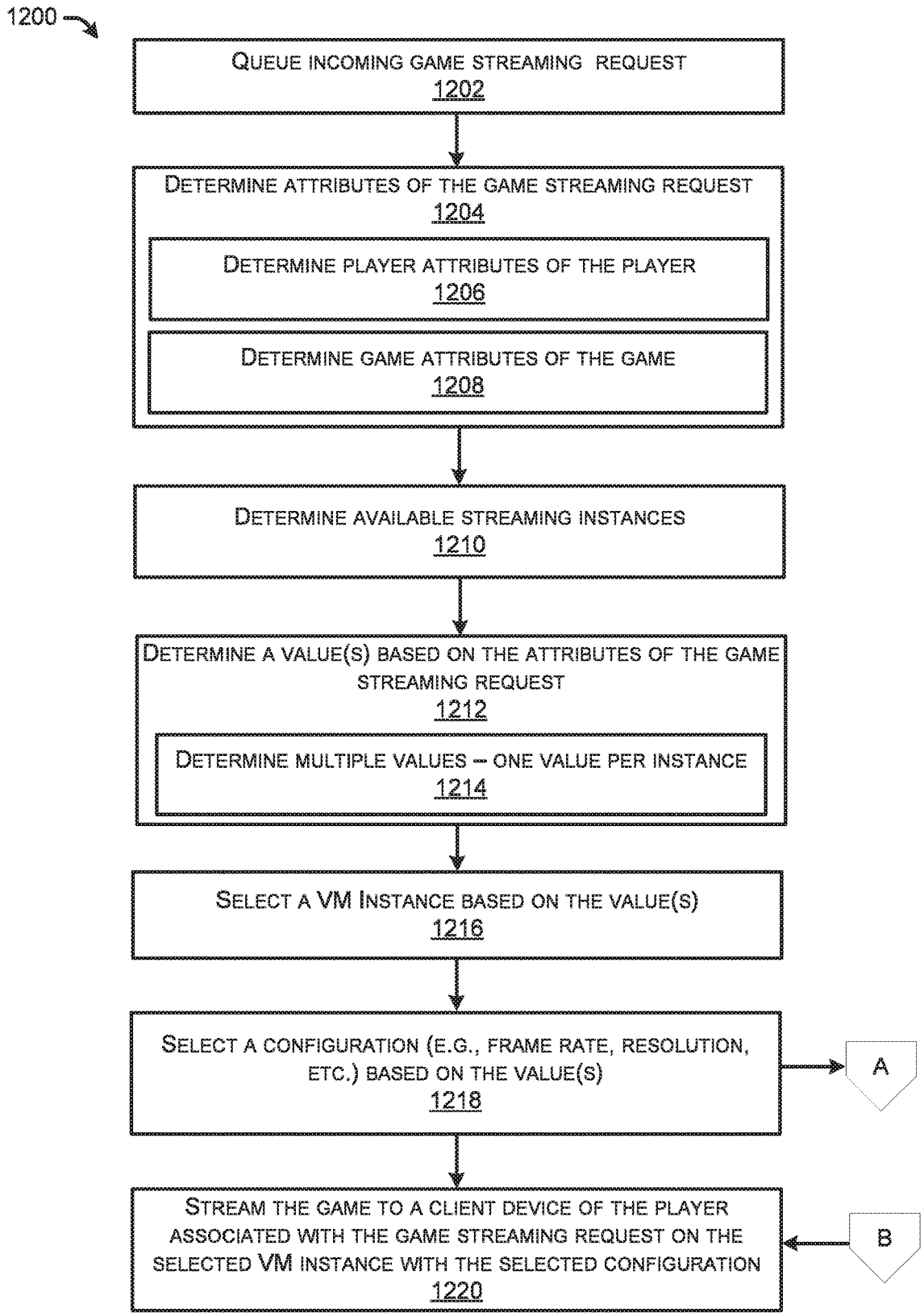
FIG. 12 illustrates a flow diagram of an example process for using a value-based approach to assign a VM instance to game streaming request.

FIG. 12 illustrates a flow diagram of an example process 1200 for using a value-based approach to assign a VM instance 1026 to game streaming request 1028. For discussion purposes, the process 1200 is described with reference to the previous figures.

At 1202, a queue component 148 of the game-streaming service 1006 may queue 1104 a game streaming request 1028 in a queue 228. Said another way, the game streaming request 1028 may be placed in a queue 228. This is depicted schematically in FIG. 11. The game streaming request 1028 may be associated with a subscriber 110 of a service provider network 1002. The subscriber 110 may represent a game developer of an online, multiplayer video game (or, game). Therefore, the game streaming request 1028 may correspond to a game of the subscriber 110. Furthermore, the game streaming request 1028 may be associated with at least one player 112 who may desire to stream the game to his/her client device 114, which may be a mobile device connected to a WiFi or cellular network.

At 1204, the queue component 148 may determine one or more attributes 306 of the game streaming request 1208 queued at block 1202. The queue component 148 may access attribute data 212 (e.g., from the data store 134) in order to determine the attributes 306 at block 1204. In some embodiments, the queue component 148 may make a call (e.g., an API call) to get the attributes 306 at block 1204. In some examples, at least some of the attribute data 212 may have been provided by the subscriber 110 voluntarily. In some examples, at least some of the attribute data 212 may have been derived by the game-streaming service 1006 from hosting past game sessions 136 on behalf of the subscriber 110. As shown by sub-blocks 1206 and 1208, the attributes 306 may include, without limitation, player attributes 306(1) and/or game attributes 306(2).

Accordingly, at 1206, the queue component 148 may determine player attributes 306(1) of a player 112 associated with the game streaming request 1028. As described herein, player attributes 306(1) may be based at least in part on prior gameplay of the player 112, and may include, without limitation, a player ID 308 (e.g., an account name, an account number, a player alias, etc.), a number of games played 310 over a period of time, whether the player 112 is a paying player (as opposed to a player that exclusively plays free-to-play games), and, if so, an amount of money spent 312 by the player 112 over the period of time, an amount of time spent playing games, a time(s) of day that games were played, other players 112 that were involved in a common match, whether a player ID is a known player ID (e.g., a famous/professional gamer, a known blogger, a game reviewer, a person with an above-threshold number of social media followers, etc.), whether the player has purchased DLC, and the like.

Additionally, or alternatively, at 1208, the queue component 148 may determine game attributes 306(2) of a game corresponding to the game streaming request 1208. Game attributes 306(2) may be indicative of a game situation, a game context, or the like, and may include, without limitation, a game mode 314 (e.g., whether a game is to be played in a tournament mode or in casual mode), and if the game is to be played in tournament mode, a phase 316 of a tournament (e.g., Phase 3 out of a total of 5 Phases), whether the game is to be live-streamed 318 (i.e., broadcast to one or more viewing users), and if so, a projected number of viewing users in the audience, and the like.

At 1210, the queue component 148 may determine available VM instances 1026 that are allocated to the subscriber 110 for streaming the game to a client device 114 of the player 112. The queue component 148 may access streaming instance data 236 (e.g., from the data store 134) in order to determine the available VM instances 1026 at block 1210. In some embodiments, the queue component 148 may make a call (e.g., an API call) to get the available streaming instances 1026 (or streaming instance data 236 pertaining thereto) at block 1210. As described herein, a subscriber 110 may be allocated multiple VM instances 1026 that are located across disparate regions as part of a subscription to the game-streaming service 1006 of the service provider network 1002. Accordingly, the operations performed at block 1210 may include determining at least a first VM instance 1026(1)(1) (in a first region) allocated to the subscriber 110, and determining a VM instance 1026(2)(1) (in a second region) allocated to the subscriber 110. In addition, the various VM instances 1026 identified at block 1210 may be characterized by different performance metrics, such as latency, capacity, current utilization, etc. For example, a first VM instance 1026(1)(1) may provide a first latency to the client device 114 of the player 112 associated with the request 1028, a second VM instance 1026(2)(2) may provide a second latency to the client device 114 of the player 112 associated with the request 1028, and so on and so forth, depending on the number of available streaming instances 1026. As another example, the available VM instances 1026 determined at block 1210 may vary in terms of available capacity and/or current resource utilization. For example, a first VM instance 1026(1)(1) may be running one process, and a second VM instance 1026(2)(1) may be running multiple (e.g., four) processes. This can mean that different instances 1026 can have different capacities, where the VM instance 1026(1)(1) running the single process may be able to provide the snappiest response with relatively less jitter during game streaming, and the VM instance 1026(2)(1) running the multiple processes concurrently may have less capacity to stream the game to the client device 114, yet it may be able to provide a lower cost for streaming the game as part of a corresponding the game session (e.g., at a relatively lower frame rate, a relatively lower resolution, etc.).

At 1212, the queue component 148 may determine a value(s) 238 based at least in part on the attributes 306 of the game streaming request 1028 determined at block 1204. In some embodiments, the value(s) 238 may be determined at block 1212 using a streaming instance assignment algorithm 215, as described herein. A streaming instance assignment algorithm 215 may be a rule-based algorithm that evaluates one or more rules 1132. For example, a rule-based algorithm 215 may evaluate whether the player 112 has played an above-threshold number of games over a period of time via the game-streaming service 1006, and/or whether any of the player 112 has spent an above-threshold amount of money over the period of time via the game-streaming service 1006, and similar rules. Thus, one or more rules can be evaluated based on the attributes 306 at block 1212. Additionally, or alternatively, a streaming instance assignment algorithm 215 may be a machine-learning-based algorithm that provides the attributes 306 as input 1128 to a trained machine learning model(s) 1134, as described herein. The output 1130 of the trained machine learning model(s) 1134 may be one or more values 238 at block 1212. In some embodiments, the value(s) 238 may be determined, at block 1212, based at least in part on properties of the available streaming instances 1026 specified in the streaming instance data 236, such as properties including, without limitation, latencies 324 of the available VM instances 1026 relative to the client device 114 of the player 112, capacities 326 (e.g., a number of concurrently running processes 132, or some other utilization metric) of the available VM instances 1026, cost 327 of the available instances 1026, and the like.

At 1214, the queue component 148 may determine multiple values 238, one value 238 per available VM instance 1026 determined at block 1210. For example, the queue component 148 may determine, based on the attributes 306, a first value 238 associated with the first VM instance 1026(1)(1), a second value 238 associated with a second VM instance 1026(2)(1), and possibly additional values 238 for additional VM instances 1026. Here, the first value 238 may be indicative of a first preference for assigning the first VM instance 1026(1)(1) to the game streaming request 1028, and the second value 238 may be indicative of a second preference for assigning the second VM instance 1026(2)(1) to the game streaming request 1028, where the second preference may be a stronger or weaker preference, or the same preference (if the multiple values 238 are equal), as the first preference.

At 1216, the queue component 148 may select, based at least in part on the value(s) 238 determined at block 1212, a VM instance 1026 (e.g., the first VM instance 1026(1)(1) or the second VM instance 1026(2)(1)) as a selected VM instance 1026. The selection at block 1216 may be based at least in part on a comparison between multiple values determined at block 1214 (e.g., a comparison between a first value 238 for the first VM instance 1026(1)(1) and the second value 238 for the second VM instance (2)(1)). For example, if the first value 238 is greater than the second value 238, the queue component 148 may select the VM instance 1026 associated with the greater, first value 238. The selection at block 1216 may be based on a comparison between fleet properties (e.g., performance metrics) of the available VM instances 102 (e.g., a comparison between a first latency that the first VM instance 1026(1)(1) provides to the client device 114 of the player 112 and a second latency that the second VM instance 1026(2)(1) provides to the client device 114 of the player 112). Accordingly, at block 1216, the queue component 148 may determine latencies (and/or other fleet/instance properties such as capacity (and/or other performance metrics), cost, etc.) of multiple VM instances 1026, such as a first latency that the first VM instance 1026(1)(1) provides to the client device 114 of the player 112, a second latency that the second VM instance 1026(2)(1) provides to the client device 114 of the player 112, and possibly additional latencies, depending on the number of VM instances 1026 evaluated. If a first latency is less than a second latency, the queue component 148 may select the VM instance 1026 associated with the lower latency (the higher latency, depending on how the value-based streaming instance assignment algorithm 215 is configured). In some embodiments, the value(s) 238 determined at block 1212 may be based at least in part on streaming instance data 236 that specifies the instance properties of each available VM instance 1026. In this way, the selection of the VM instance 1026 at block 1216 can be based on the value(s) 238, which, in turn, is/are based on the properties of the available VM instances 1026 (e.g., latencies, capacities, costs, etc.).

At 1218, the queue component 148 may select, based at least in part on the value(s) 238, a configuration of multiple available configurations as a selected configuration. For example, the queue component 148 may have a choice between streaming the game to the client device 114 at different frame rates (e.g., 30 FPS, 15 FPS, etc.), and/or at different resolutions (e.g., 1080P, 4K, etc.). Accordingly, the selection at block 1218 may involve selecting a frame rate of multiple available frame rates as a selected frame rate, and/or selecting a resolution of multiple available resolutions as a selected resolution, etc.

At As shown by the off-page reference "A" in FIGS. 5 and 12, the process 1200 may continue from block 1218 to block 502 of the process 500, where an incoming game session request is queued. In other words, blocks 1202 through 1218 of the process 1200 may represent a first phase of a multi-phase process where a streaming instance 1026 is assigned to a game streaming request 1028, and, subsequently, the process 500 may represent a second phase of the multi-phase process where a game session 136 involving the player 112 associated with the game streaming request 1028 is placed for hosting a multi-player game session with one or more other players 112. Once a VM instance of the selected fleet 138 starts executing to host the game session 136, the process 500 may continue from block 520 to block 1220 of the process 1200, as indicated by the off-page reference "B" in FIGS. 5 and 12.

At 1220, the game-streaming service 1006 may stream the game to the client device 114 of the player 112 as part of the game session 136 involving the player 112 and one or more other players 112. The streaming at block 1220 may include executing the selected VM instance 1026 to render frames, to send the frames to the client device 114 with the selected configuration (e.g., at the selected frame rate, the selected resolution, etc.), and to receive control input data from the client device 114. Meanwhile, the corresponding game session 136 may be hosted using a VM instance 126 of the selected fleet 138 that was selected for game session placement, as described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   placing, by a game hosting service of a service provider network, a game streaming request corresponding to a game in a queue, the game streaming request associated with a subscriber of the service provider network;
   accessing, by the game hosting service, attribute data to determine player attributes of a player associated with the game streaming request, wherein the player attributes are based at least in part on prior gameplay of the player;
   accessing, by the game hosting service, streaming instance data to determine available virtual machine (VM) instances that are allocated to the subscriber for streaming the game to a client device of the player, the available VM instances including at least a first VM instance that has a first performance characteristic and a second VM instance that has a second performance characteristic, wherein the first performance characteristic and the second performance characteristic indicate that the second VM instance is higher performance than the first VM instance;
   selecting, by the game hosting service, based on the player attributes, the first VM instance as a selected VM instance for hosting the game; and
   causing, by the game hosting service, the game to be hosted on the selected VM instance.

2. The method of claim 1, wherein the player is a first player and the player attributes are first player attributes, and further comprising:
   determining second player attributes of second players associated with a game session request, the game session request associated with the subscriber and with the first player;
   determining a first fleet of VM instances allocated to the subscriber;
   determining a second fleet of VM instances allocated to the subscriber;
   selecting, based on the first player attributes and the second player attributes, the first fleet or the second fleet as a selected fleet; and
   causing a game session corresponding to the game session request to be hosted on a VM instance of the selected fleet.

3. The method of claim 1, further comprising evaluating one or more rules based on the player attributes by:

providing the player attributes as input to a first function that computes a first value associated with the first VM instance; and
providing the player attributes as input to a second function that computes a second value associated with the second VM instance,
wherein the selecting the first VM instance as the selected VM instance is based on a comparison of the first value and the second value.

4. The method of claim 1, further comprising selecting, based on the player attributes, at least one of:
   a frame rate of multiple available frame rates as a selected frame rate; or
   a resolution of multiple available resolutions as a selected resolution,
   wherein the causing of the game to be hosted comprises causing the game to be hosted at the selected frame rate or the selected resolution.

5. A method comprising:
   determining, by a game hosting service of a service provider network, one or more player attributes of a player associated with a game streaming request corresponding to a game, the one or more player attributes based at least in part on prior gameplay of the player, and the game streaming request associated with a subscriber of the service provider network;
   determining, by the game hosting service, a first virtual machine (VM) instance allocated to the subscriber for streaming the game to a client device of the player;
   determining, by the game hosting service, a second VM instance allocated to the subscriber for streaming the game to the client device;
   selecting, by the game hosting service, based at least in part on the one or more player attributes, the first VM instance or the second VM instance as a selected VM instance for streaming the game to the client device; and
   streaming, by the game hosting service, the game to the client device by executing the selected VM instance to render frames and to send the frames to the client device.

6. The method of claim 5, further comprising selecting, based at least in part on the one or more player attributes, at least one of:
   a frame rate of multiple available frame rates as a selected frame rate; or
   a resolution of multiple available resolutions as a selected resolution,
   wherein the streaming of the game to the client device comprises streaming the game at the selected frame rate or the selected resolution.

7. The method of claim 5, wherein the player is a first player and the one or more player attributes are one or more first player attributes, and further comprising:
   determining one or more second player attributes of second players associated with a game session request, the game session request associated with the subscriber and with the first player;
   determining a first fleet of VM instances allocated to the subscriber;
   determining a second fleet of VM instances allocated to the subscriber;
   selecting, based at least in part on the one or more first player attributes and the second player attributes, the first fleet or the second fleet as a selected fleet; and causing a game session corresponding to the game session request to be hosted on a VM instance of the selected fleet.

8. The method of claim 5, further comprising determining multiple values based at least in part on the one or more player attributes, the multiple values comprising:
   a first value associated with the first VM instance, the first value indicative of a first preference for assigning the first VM instance to the game streaming request; and
   a second value associated with the second VM instance, the second value indicative of a second preference for assigning the second VM instance to the game streaming request,
   wherein the selecting is based at least in part on a comparison between the first value and the second value.

9. The method of claim 5, wherein the one or more player attributes include at least one of:
   a player identifier (ID);
   a number of games played over a period of time;
   whether the player is a paying player;
   an amount of money spent by the player over the period of time;
   an amount of time spent playing games; or
   one or more times of day that games were played.

10. The method of claim 5, further comprising determining one or more game attributes of the game, and wherein:
    the selecting is further based at least in part on the one or more game attributes; and
    the one or more game attributes include at least one of:
       whether the game is to be played in a tournament mode or in casual mode;
       a phase of a tournament, or
       whether the game is to be live-streamed.

11. The method of claim 5, further comprising at least one of:
    providing the one or more player attributes as input to a function that computes a first value; or
    providing the one or more player attributes as input to a trained machine learning model that generates a second value as output,
    wherein the selecting is based at least in part on the first value or the second value.

12. The method of claim 5, further comprising:
    determining a first latency that the first VM instance provides to the client device; and
    determining a second latency that the second VM instance provides to the client device,
    wherein the selecting is based at least in part on a comparison between the first latency and the second latency.

13. The method of claim 5, further comprising:
    determining a first capacity of the first VM instance; and
    determining a second capacity of the second VM instance,
    wherein the selecting is based at least in part on a comparison between the first capacity and the second capacity.

14. The method of claim 5, further comprising:
    determining a first cost of the first VM instance; and
    determining a second cost of the second VM instance,
    wherein the selecting is based at least in part on a comparison between the first cost and the second cost.

15. A system comprising:
    one or more processors; and
    non-transitory computer-readable media storing computer-executable instructions that, when executed by the one or more processors, cause the system to:
       determine one or more player attributes of a player associated with a game streaming request corresponding to a game, the one or more player attributes based at least in part on prior gameplay of the player, and the game streaming request associated with a subscriber of a service provider network;
       determine a first virtual machine (VM) instance allocated to the subscriber for streaming the game to a client device of the player;
       determine a second VM instance allocated to the subscriber for streaming the game to the client device;
       select, based at least in part on the one or more player attributes, the first VM instance or the second VM instance as a selected VM instance for streaming the game to the client device; and
       cause the game to be hosted on the selected VM instance.

16. The system of claim 15, wherein the computer-executable instructions, when executed by the one or more processors, further cause the system to:
    select, based at least in part on the one or more player attributes, a configuration of multiple available configurations as a selected configuration,
    wherein causing the game to be hosted comprises causing the game to be hosted with the selected configuration.

17. The system of claim 15, wherein the player is a first player and the one or more player attributes are one or more first player attributes, and the computer-executable instructions, when executed by the one or more processors, further cause the system to:
    determine one or more second player attributes of second players associated with a game session request, the game session request associated with the subscriber and with the first player;
    determine a first fleet of VM instances allocated to the subscriber;
    determine a second fleet of VM instances allocated to the subscriber;
    select, based at least in part on the one or more first player attributes and the second player attributes, the first fleet or the second fleet as a selected fleet; and
    cause a game session corresponding to the game session request to be hosted on a VM instance of the selected fleet.

18. The system of claim 15, wherein the one or more player attributes include at least one of:
    a player identifier (ID);
    a number of games played over a period of time;
    whether the player is a paying player;
    an amount of money spent by the player over the period of time;
    an amount of time spent playing games; or
    one or more times of day that games were played.

19. The system of claim 15, wherein the computer-executable instructions, when executed by the one or more processors, further cause the system to select, based at least in part on the one or more player attributes, at least one of:
    a frame rate of multiple available frame rates as a selected frame rate; or
    a resolution of multiple available resolutions as a selected resolution,
    wherein causing the game to be hosted comprises causing the game to be hosted at the selected frame rate or the selected resolution.

20. The system of claim 15, wherein the computer-executable instructions, when executed by the one or more processors, further cause the system to determine one or more game attributes of the game, and wherein selecting the first VM instance or the second VM instance is further based at least in part on the one or more game attributes.

\* \* \* \* \*